(12) United States Patent
He et al.

(10) Patent No.: US 11,307,724 B2
(45) Date of Patent: Apr. 19, 2022

(54) TOUCH SUBSTRATE, DISPLAY PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Fan He, Beijing (CN); Kemeng Tong, Beijing (CN); Xiangdan Dong, Beijing (CN); Zhengwei Luo, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/015,980

(22) Filed: Sep. 9, 2020

(65) Prior Publication Data
US 2021/0072865 A1    Mar. 11, 2021

(30) Foreign Application Priority Data
Sep. 10, 2019    (CN) .......................... 201910855154.1

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 3/0443* (2019.05); *G06F 2203/04102* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| 2016/0378224 A1* | 12/2016 | Kwon | ................. H01L 27/3279 345/174 |
| 2019/0014664 A1* | 1/2019 | Ahn | ....................... G06F 3/0412 |
| 2020/0194468 A1* | 6/2020 | Luo | ..................... H01L 27/1248 |

* cited by examiner

*Primary Examiner* — Deeprose Subedi
(74) *Attorney, Agent, or Firm* — Procopio, Cory, Hargreaves & Savitch LLP

(57) ABSTRACT

A touch substrate includes a base and a touch structure disposed on the base. The base has at least one bending region, and a portion of the base located in each bending region is bendable. The touch structure includes a plurality of touch electrodes and a plurality of touch electrode wires electrically connected to the plurality of touch electrodes. At least one touch electrode wire includes a first portion located in one of the at least one bending region, and at least one first through hole is disposed in the first portion.

18 Claims, 21 Drawing Sheets

TOUCH SUBSTRATE, DISPLAY PANEL AND DISPLAY DEVICE

CROSS-REFERENCE TO RELATED APPLICATION

This application claims priority to and the benefit of Chinese Patent Application No. 201910855154.1, filed on Sep. 10, 2019, which is incorporated herein by reference in its entirety.

TECHNICAL FIELD

The present disclosure relates to the field of display technologies, and in particular, to a touch substrate, a display panel and a display device.

BACKGROUND

With rapid development of display technologies, in order to provide users with an excellent experience, display devices such as mobile phones have gradually developed to be foldable or rollable.

Moreover, a display device may achieve a touch function by integrating a touch structure into the display device. Foldable display devices and rollable display devices with the touch function are more and more widely used.

SUMMARY

In an aspect, embodiments of the present disclosure provide a touch substrate including a base and a touch structure disposed on the base. The base has at least one bending region, a portion of the base located in each bending region is bendable. The touch structure includes a plurality of touch electrodes and a plurality of touch electrode wires electrically connected to the plurality of touch electrodes. At least one touch electrode wire includes a first portion located in one of the at least one bending region, and at least one first through hole is disposed in the first portion.

In some embodiments, a first portion in the at least one touch electrode wire is a first zigzag-shaped line segment.

In some embodiments, the touch substrate further includes a plurality of auxiliary wires. Each touch electrode wire is electrically connected to a corresponding auxiliary wire, and an orthographic projection of the touch electrode wire on the base at least partially overlaps with an orthographic projection of the corresponding auxiliary wire on the base.

In some embodiments, an auxiliary wire electrically connected to the touch electrode wire including the first portion includes a second portion located in the one of the at least one bending region, and at least one second through hole is provided in the second portion. In the auxiliary wire and the touch electrode wire electrically connected to the auxiliary wire, an orthographic projection of each first through hole on the base at least partially overlaps with an orthographic projection of a corresponding second through hole on the base.

In some embodiments, the first portion of the touch electrode wire is a first zigzag-shaped line segment, and the second portion of the auxiliary wire is a second zigzag-shaped line segment.

In some embodiments, the touch substrate further includes an insulating layer disposed between the plurality of touch electrode wires and the plurality of auxiliary wires. A plurality of third through holes are disposed in the insulating layer; and the touch electrode wire is electrically connected to a corresponding auxiliary wire through at least one third through hole.

In some embodiments, at least one third through hole of the plurality of third through holes is located in the one of the at least one bending region, and the at least one third through hole is a strip-shaped through hole extending along an extending direction of the touch electrode wire.

In some embodiments, each side of each of the at least one third through hole extending along the extending direction of the touch electrode wire is parallel to both a corresponding side of a corresponding auxiliary wire extending along the extending direction of the touch electrode wire and a corresponding side of a corresponding touch electrode wire extending along the extending direction of the touch electrode wire.

In some embodiments, the base further has a touch region and a wiring region, and the wiring region is disposed on a periphery of the touch region. The plurality of touch electrodes are disposed in the touch region, and the plurality of touch electrode wires and the plurality of auxiliary wires are disposed in the wiring region. The bending region and the wiring region have an overlapping region. A plurality of fifth through holes are disposed in the insulating layer, and the plurality of fifth through holes are disposed in the overlapping region. Orthographic projections of the plurality of fifth through holes on the base do not overlap with both orthographic projections of the plurality of touch electrode wires on the base and orthographic projections of the plurality of auxiliary wires on the base.

In some embodiments, the plurality of touch electrodes include a plurality of first touch electrodes and a plurality of second touch electrodes that are arranged crosswise and insulated from each other. The plurality of touch electrode wires include a plurality of first touch electrode wires and a plurality of second touch electrode wires that are insulated from each other; and each first touch electrode is electrically connected to at least one first touch electrode wire, and each second touch electrode is electrically connected to at least one second touch electrode wire.

In some embodiments, each first touch electrode includes a plurality of first touch sub-electrodes and a plurality of bridge portions, and any two adjacent first touch sub-electrodes in the first touch electrode are electrically connected through a bridge portion. The plurality of first touch sub-electrodes are disposed in a same layer as the plurality of second touch electrodes; and the plurality of auxiliary wires are disposed in a same layer as the plurality of bridge portions.

In some embodiments, each second touch electrode includes a plurality of second touch sub-electrodes and a plurality of connecting portions, and any two adjacent second touch sub-electrodes in the second touch electrode are electrically connected through a connecting portion; and the plurality of second touch sub-electrodes and the plurality of connecting portions are disposed in a same layer and are of an integrated structure.

In some embodiments, each of all the plurality of first touch sub-electrodes and the plurality of second touch sub-electrodes has a mesh structure.

In some embodiments, the plurality of first touch sub-electrodes and the plurality of second touch electrodes are made of a same metal material or different metal materials.

In some embodiments, the plurality of first touch sub-electrodes, the plurality of second touch electrodes, the plurality of first touch electrode wires and the plurality of second touch electrode wires are disposed in a same layer.

In another aspect, embodiments of the present disclosure provide a display panel including the above touch substrate.

In some embodiments, the display panel further includes a display layer disposed on the base and an encapsulation layer disposed on a side of the display layer away from the base. The display layer has a first display region, the first display region includes a plurality of first sub-pixel regions, and each first sub-pixel region includes a first light-emitting region. The touch structure is disposed at a side of the encapsulation layer away from the base, and an orthographic projection of the touch structure on the base does not overlap with orthographic projections of all first light-emitting regions on the base.

In yet another aspect, embodiments of the present disclosure provide a display device including the above display panel.

In yet another aspect, embodiments of the present disclosure provide a display device including a display panel and the above touch substrate. The touch substrate is fixed to a light-emitting surface of the display panel through the adhesive layer, and the touch structure is disposed between the base of the touch substrate and the display panel.

In some embodiments, the display panel has a second display region, the second display region includes a plurality of second sub-pixel regions, and each second sub-pixel region includes a second light-emitting region. An orthographic projection of the touch structure on the display panel does not overlap with all second light-emitting regions.

BRIEF DESCRIPTION OF THE DRAWINGS

In order to describe technical solutions in the present disclosure more clearly, accompanying drawings to be used in some embodiments of the present disclosure will be introduced below briefly. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, an actual process of a method and actual timings of signals that the embodiments of the present disclosure relate to.

DETAILED DESCRIPTION

Figure 1A:
FIG. 1A is a diagram showing a structure of a touch substrate, in accordance with some embodiments of the present disclosure.

Technical solutions in some embodiments of the present disclosure will be described clearly and completely with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, the term "comprise" and other forms thereof, such as the third-person singular form "comprises" and the present participle form "comprising", in the description and the claims are construed as open and inclusive, i.e., "inclusive, but not limited to". In the description, terms such as "one embodiment", "some embodiments", "exemplary embodiments", "example", "specific example", or "some examples" are intended to indicate that specific features, structures, materials or characteristics related to the embodiment(s) or the example(s) are included in at least one embodiment or example of the present disclosure. Schematic representations of the above terms do not necessarily refer to the same embodiment(s) or example(s). In addition, the specific features, structures, materials or characteristics may be included in any one or more embodiments/examples in any suitable manner.

Hereinafter, the terms such as "first" and "second" are used for descriptive purposes only, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a plurality of" and "the plurality of" each mean two or more unless otherwise specified.

In the description of some embodiments, the term "connected" may be used. For example, the term "connected" may be used in the description of some embodiments to indicate that two or more components are in direct physical or electrical contact with each other. However, the term "connected" may also mean that two or more components are not in direct contact with each other but still cooperate or interact with each other. The embodiments disclosed herein are not necessarily limited to the content herein.

It will be understood that when a layer or element is referred to as being "on" another layer or substrate, it can be directly on the other layer or substrate, or intervening layers may also be present.

That A and B are disposed in a same layer may refer to that A and B are formed by a process as follows: a film is formed first by using a same film-forming process and then a patterning process is performed on the film by using a same mask to form layer structure with specific patterns including A and B. Depending on different specific patterns, the patterning process may include exposure, development and/or etching processes, and the specific patterns may be continuous or discontinuous, and these specific patterns may also be at different heights or have different thicknesses.

As shown in FIG. 1A, some embodiments of the present disclosure provide a touch substrate 24. The touch substrate 24 includes a base 240 and a touch structure 10 disposed on the base 240. The touch structure 10 is configured to sense a touch.

The base 240 may be a flexible base. For example, a material of the base 240 is a flexible material such as polyimide (PI) or polyethylene terephthalate (PET), so that the touch substrate 24 is foldable or rollable. Alternatively, the base 240 may include a rigid portion and a flexible portion. A material of the rigid portion may include glass, and a material of the flexible portion may include the PI or the PET, so that the flexible portion is foldable or rollable.

In some examples, the touch structure 10 is directly disposed on the base 240. In some other examples, other layers are provided on the base 240, and the touch structure 10 is disposed on the other layers.

Figure 1B:
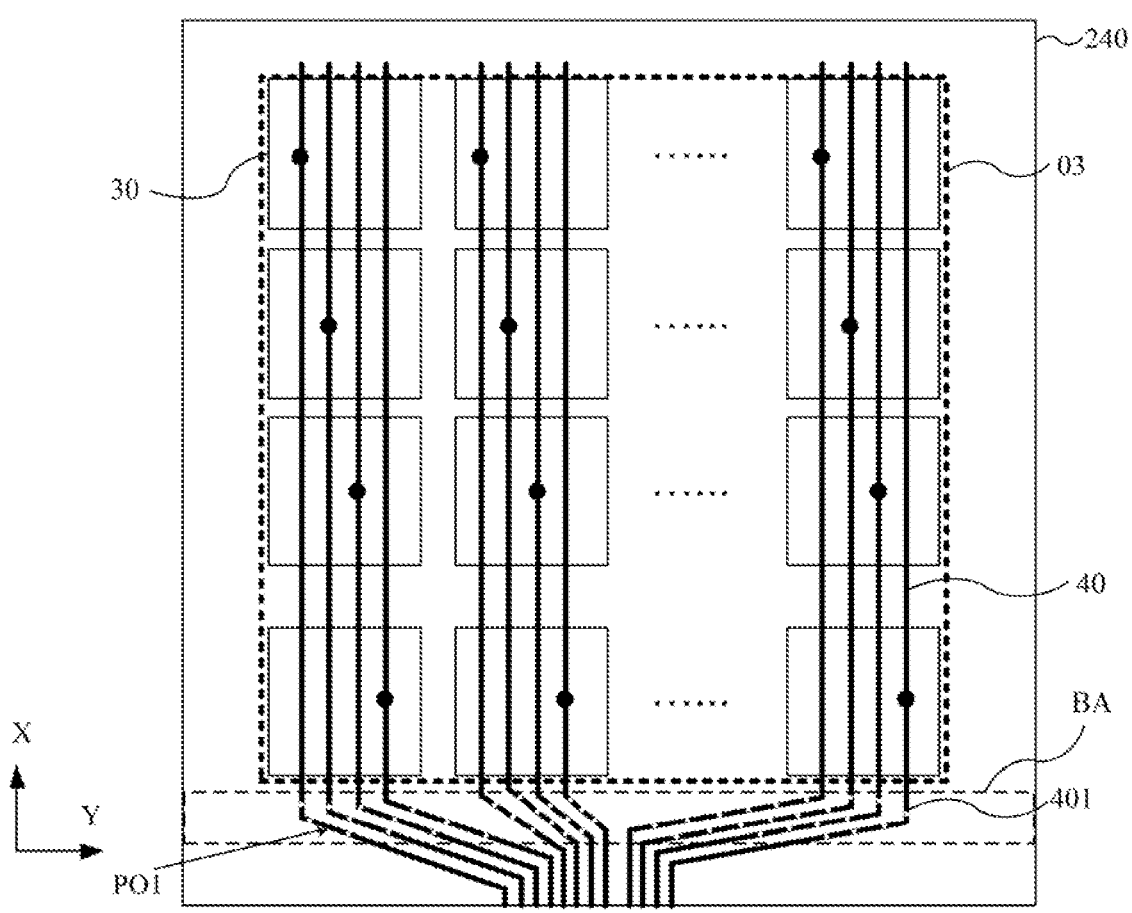
FIG. 1B is a top view of a touch substrate, in accordance with some embodiments of the present disclosure.
Figure 1C:
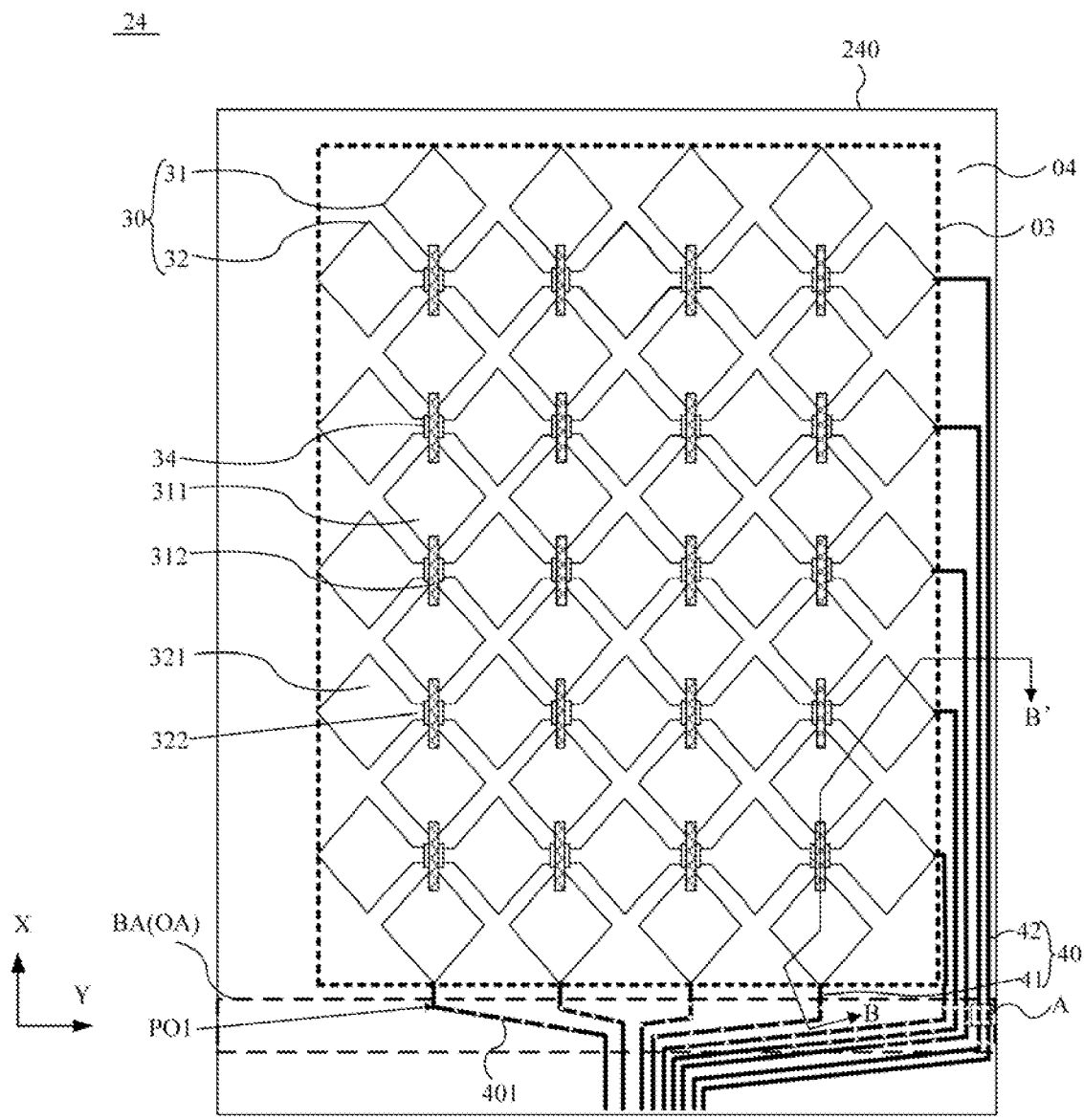
FIG. 1C is a top view of another touch substrate, in accordance with some embodiments of the present disclosure.
Figure 1D:
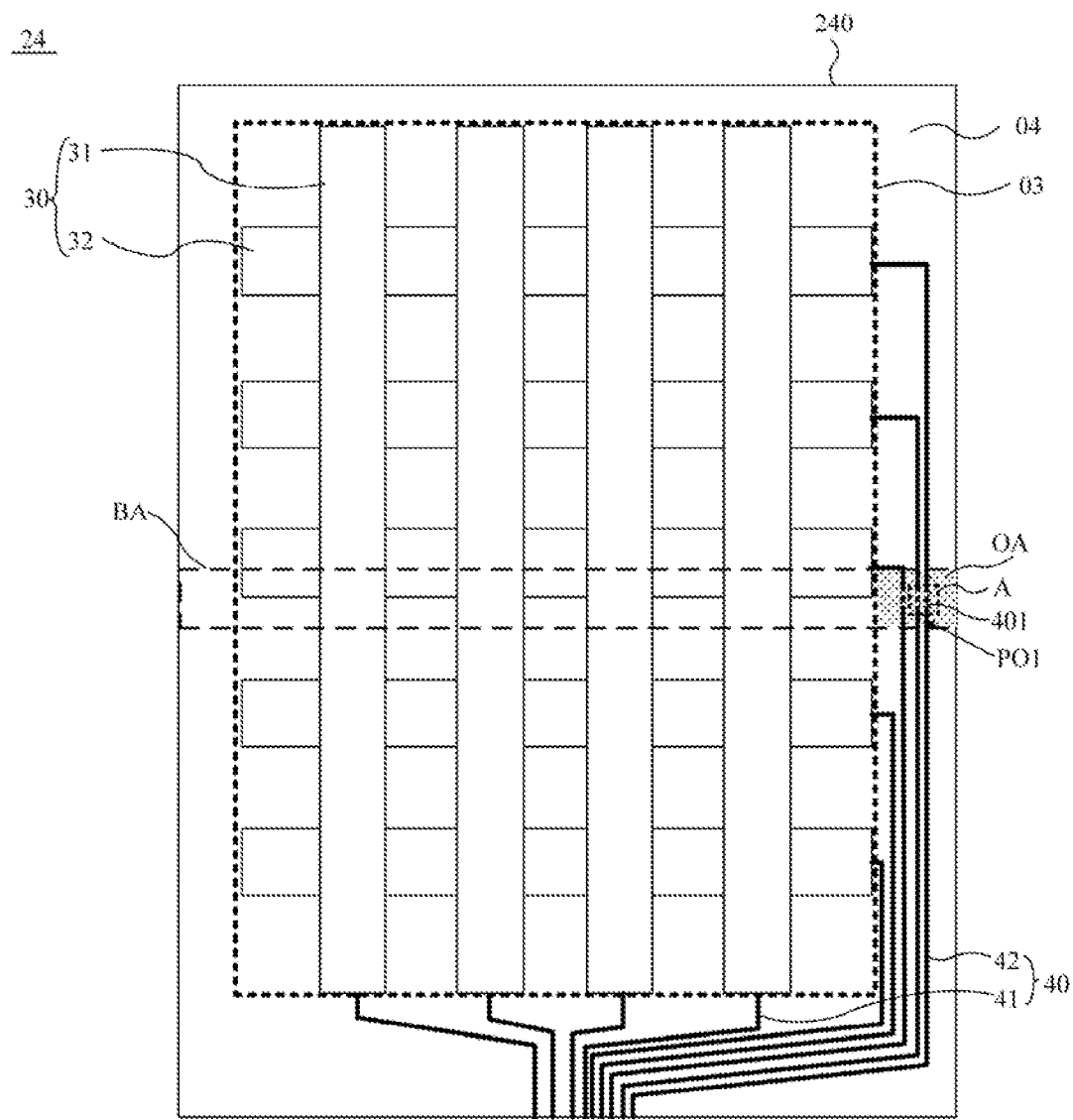
FIG. 1D is a top view of yet another touch substrate, in accordance with some embodiments of the present disclosure.

As shown in FIGS. 1B to 1D, the base 240 has at least one bending region BA, and a portion of the base 240 located in each bending region BA is bendable. Each bending region BA is configured to bend the touch substrate 24. That is, the bending region BA is capable of bending, and thus can bend and unfold the touch substrate 24.

The bending region BA may be in a shape of a rectangle. Of course, the bending region BA can have other shapes, for example, an irregular shape.

In some examples, as shown in FIGS. 1B and 1C, the at least one bending region BA includes one bending region BA. The base 240 has a touch region 03 in which all the touch electrode 30 of the touch substrate 24 are located, and the bending region BA is located at a side of the touch region 03 in a first direction X, and extends from an edge of the base 240 to an opposite edge of the base 240 in a second direction Y perpendicular to the first direction X.

It will be noted that the second direction Y may perpendicular to the edge and the opposite edge of the base 240.

In some other examples, the at least one bending region BA includes two bending regions BA that are disposed at two opposite sides of the touch region 03 of the touch substrate 24 in the first direction X, and each bending region BA extends from the edge of the base 240 to the opposite edge of the base 240 in the second direction Y.

In yet other examples, as shown in FIG. 1D, the at least one bending region BA includes one bending region BA. The bending region BA is located in a middle of the touch substrate 24, and extends from an edge of the base 240 to an opposite edge of the base 240 in the second direction Y or the first direction X.

It will be noted that, the embodiments of the present disclosure do not limit the position of the bending region BA, which may be determined according to the display device to which the touch substrate 24 is applied.

As shown in FIGS. 1B to 1D, the touch structure 10 includes a plurality of touch electrodes 30 and a plurality of touch electrode wires 40. The touch electrode 30 is electrically connected to at least one touch electrode wire 40. For example, as shown in FIGS. 1B to 1D, each touch electrode 30 is electrically connected to a touch electrode wire 40.

As shown in FIGS. 1B to 1O and 2A to 2C, at least one touch electrode wire 40 of the plurality of touch electrode wires 40 includes a first portion PO1 located in a bending region BA. At least one first through hole 401 is provided in the first portion PO1.

In some examples, as shown in FIG. 1D, the at least one bending region BA includes one bending region BA, each of some of the plurality of touch electrode wires 40 includes a first portion PO1 located in the bending region BA, and a plurality of first through holes 401 are provided in the first portion PO1.

In some other examples, as shown in FIGS. 1B and 1C, the at least one bending region BA includes one bending region BA, each of the plurality of touch electrode wires 40 includes a first portion PO1 located in the bending region BA, and a plurality of first through holes 401 are provided in the first portion PO1.

In yet other examples, the at least one bending region BA includes two bending regions BA, and the two bending regions BA are disposed at two opposite sides of the plurality of touch electrodes 30. For example, each of some of the plurality of touch electrode wires 40 includes a first portion PO1 located in one of the two bending regions BA, the first portion PO1 is provided with at least one first through hole 401, and no touch electrode wires 40 are disposed in the other of the two bending regions BA. For another example, the plurality of touch electrode wires 40 are divided into a first group of touch electrode wires and a second group of touch electrode wires. The first group of touch electrode wires and the second group of touch electrode wires each include multiple touch electrode wires 40. Each of at least a portion of the first group of touch electrode wires 40 includes a first portion PO1 located in one of the two bending regions BA, and the first portion PO1 is provided with at least one first through hole 401. Each of at least a portion of the second group of touch electrode wires 40 includes a first portion PO1 located in the other of the two bending regions BA, and the first portion PO1 is provided with at least one first through hole 401.

The number of the at least one first through hole 401 in FIGS. 1B to 1D and FIGS. 2A to 2C is merely an example, and the embodiments of the present disclosure do not limit the number of the at least one first through hole 401 in the touch electrode wire 40. In addition, the number of the at least one first through hole 401 in each touch electrode trace 40 may be the same or different.

Figure 2A:
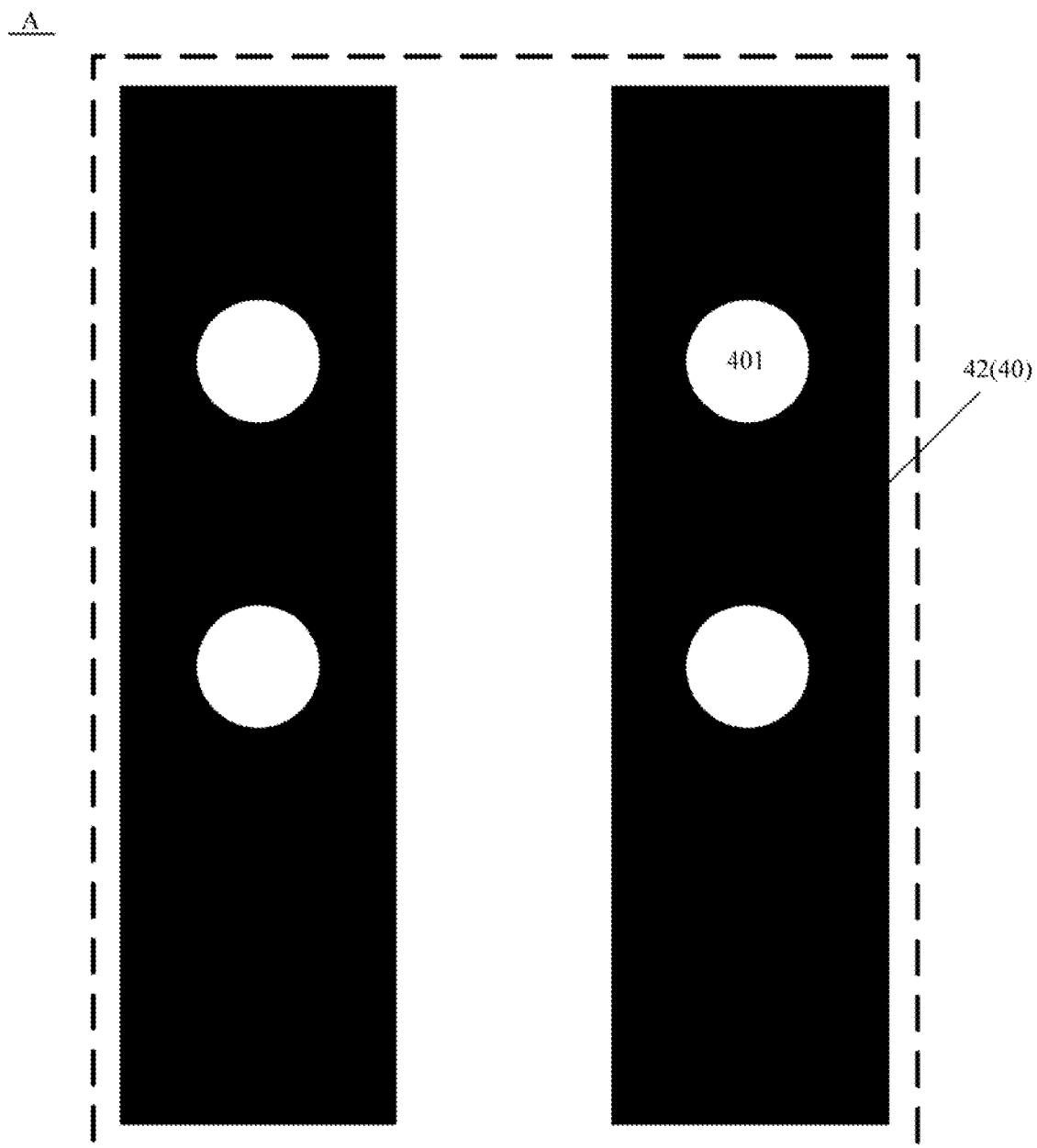
FIGS. 2A to 2C are enlarged views of any one of regions A in FIGS. 1C and 1D.
Figure 2B:
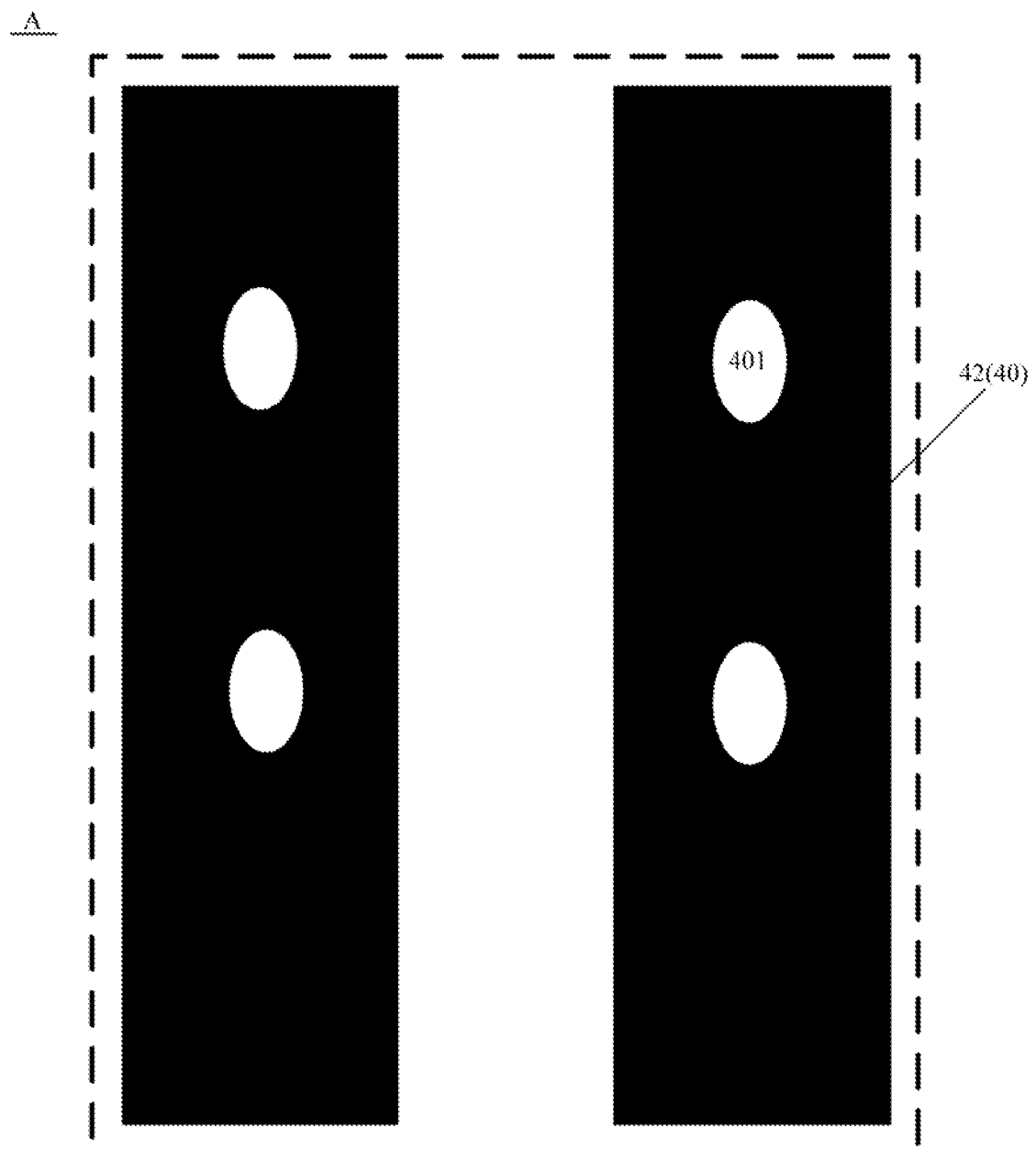
Figure 2C:
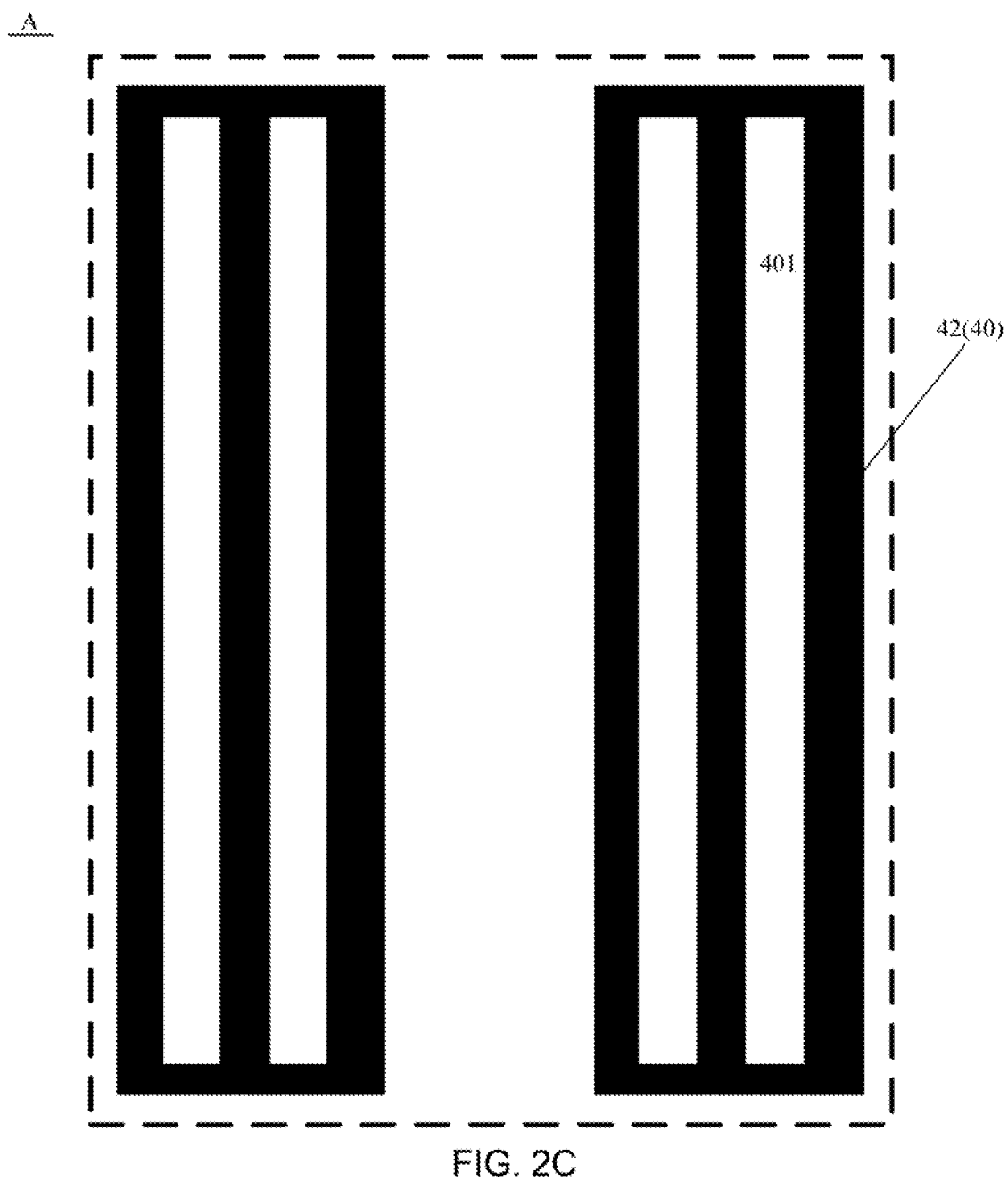

The embodiments of the present disclosure do not limit the shape of the first through hole 401, which may be, for example, as shown in FIGS. 2A to 2C, a circle, an ellipse or a rectangle. In addition, in order to ensure that the first through hole 401 does not affect conductivity of the touch electrode wire 40, the dimension of the first through hole 401 is smaller than the dimension of the touch electrode wire 40 along a direction of a line width of the touch electrode wire 40. For example, the shape of the first through hole 401 is a circle, and a diameter of the first through hole 401 is one third of a line width of the touch electrode wire 40.

In the related art, since the line width of the touch electrode wire 40 is small, when the touch substrate 24 is bent, a portion of the touch electrode wire 40 located in the bending region BA may be broken, which may affect touch performance of the touch substrate 24. However, in the touch substrate 24 provided by some embodiments of the present disclosure, as for the touch electrode wire 40 including the first portion PO1 located in the bending region BA, by providing at least one first through hole 401 in the first portion PO1, stress generated when the touch electrode wire 40 is bent along with the touch substrate 24 may be reduced through the at least one first through hole 401, and thus the portion of the touch electrode wire 40 located in the bending region BA may not be easily broken.

The touch structure 10 may be a self-capacitance touch structure or a mutual-capacitance touch structure.

The touch substrate 24 further includes a touch chip disposed at an edge of the base 240, and the plurality of touch electrode wires 40 are electrically connected to the touch chip. Taking the self-capacitance touch structure as an example, the touch chip outputs touch driving signals to the touch electrodes 30 through the touch electrode wires 40, and receives touch sensing signals from the touch electrodes 30 through the touch electrode wires 40, so as to determine a position of a touch point.

In some examples, the touch electrode wire 40 is a line segment from a point where the touch electrode wire 40 is connected to a corresponding touch electrode 30 to a point where the touch electrode wire 40 is connected to the touch chip. The first portion PO1 is only a portion of the line segment located in the bending region BA, and the line segment further includes another portion.

Figure 2D:
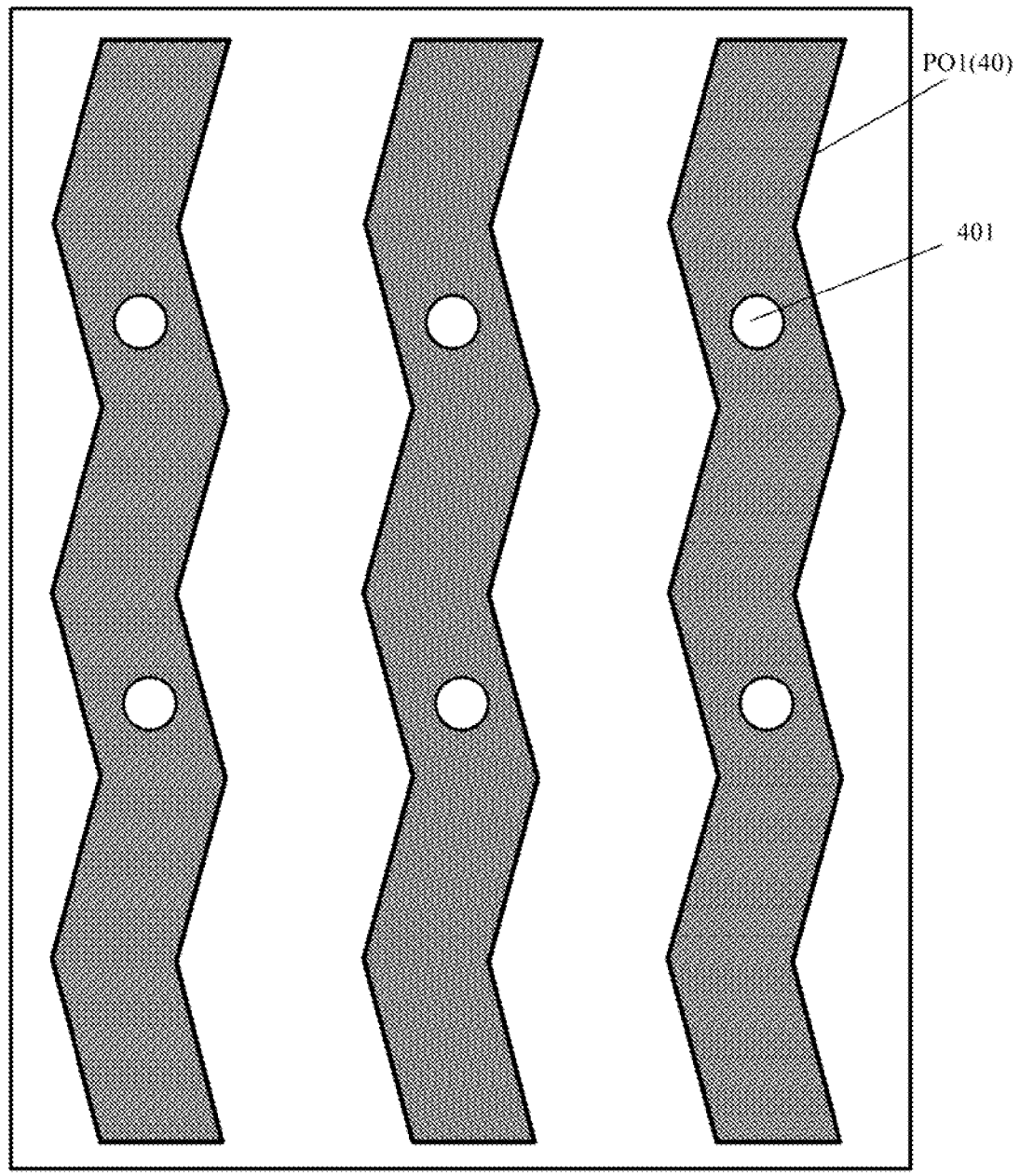
FIG. 2D is a schematic diagram of first portions of touch electrode wires, in accordance with some embodiments of the present disclosure.

In some embodiments, as shown in FIG. 2D, a first portion PO1 in the at least one touch electrode wire 40 is a first zigzag-shaped line segment. In this way, when the touch substrate 24 is bent, the first zigzag-shaped line segment is not easily broken under action of pulling stress. Therefore, it is possible to reduce a probability of a break of the portion of the touch electrode wire 40 located in the bending region BA.

For example, the at least one touch electrode wire 40 includes a plurality of touch electrode lines 40, and a first portion PO1 of each of some or all of the touch electrode lines 40 is the first zigzag-shaped line segment. For another example, the at least one touch electrode wire 40 includes one touch electrode line 40, and the first portion PO1 of the touch electrode line 40 is the first zigzag-shaped line segment.

In some examples, the first zigzag-shaped line segment includes a plurality of sub-line segments connected in sequence, and an angle between two adjacent line segments is not 0°. In this case, the first zigzag-shaped line segment is a broken line segment.

In some other examples, the first zigzag-shaped line segment includes a plurality of sub-line segments connected in sequence, and a corner where two adjacent line segments are connected is an arc-shaped corner. In this case, the first zigzag-shaped line segment is a wavy line segment.

Of course, the first zigzag-shaped line segment may further be a zigzag-shaped line segment of other forms, as long as the first portion PO1 is non-linear.

Figure 3A:
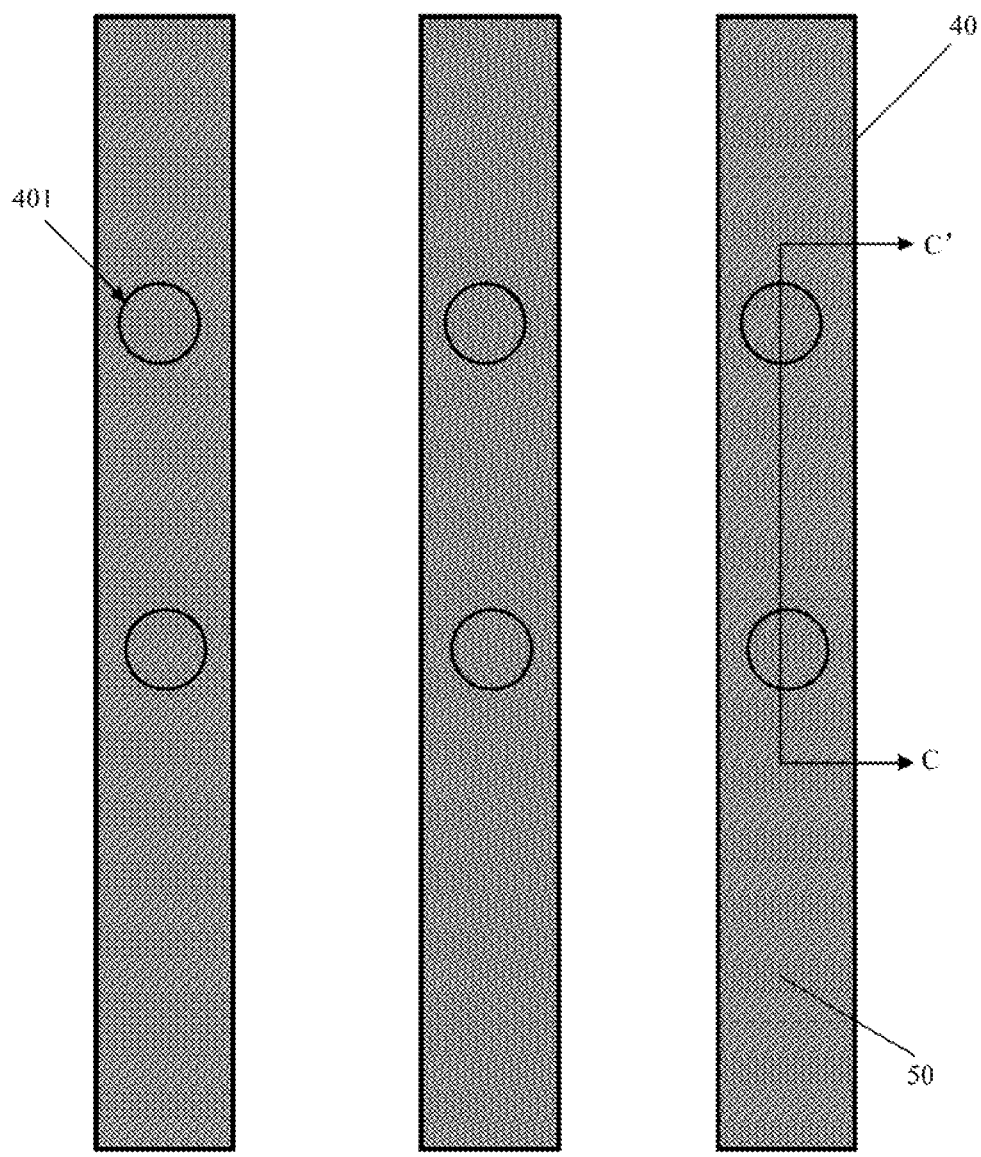
FIG. 3A is a top view of an arrangement of touch electrode wires and auxiliary wires, in accordance with some embodiments of the present disclosure.
Figure 3B:
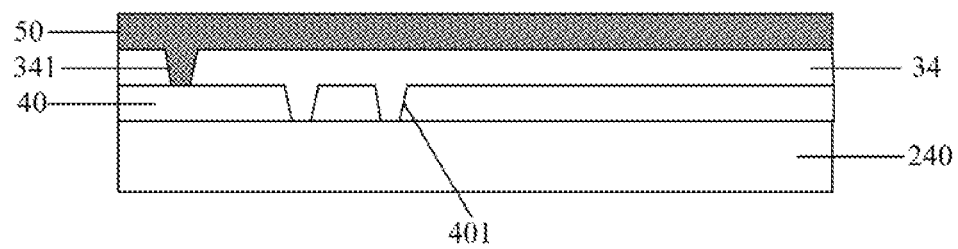
FIG. 3B is a cross-sectional view taken along line C-C' in FIG. 3A.

In some embodiments, as shown in FIGS. 3A and 3B, the touch substrate 24 further includes a plurality of auxiliary wires 50. Each touch electrode wire 40 is electrically connected to a corresponding auxiliary wire 50, and an orthographic projection of the touch electrode wire 40 on the base 240 at least partially overlaps with an orthographic projection of the auxiliary wire 50 on the base 240. For example, the orthographic projection of the touch electrode wire 40 on the base 240 completely overlaps with the orthographic projection of the auxiliary wire 50 on the base 240.

In some examples, a material of the plurality of touch electrode wires 40 is the same as a material of the plurality of auxiliary wires 50. In this way, a contact resistance between the touch electrode wire 40 and the auxiliary wire 50 electrically connected thereto may be reduced, which may be advantageous for improving touch sensitivity of the touch structure 10.

For example, each of the material of the plurality of touch electrode wires 40 and the material of the plurality of auxiliary wires 50 is a metal material, such as copper (Cu), a copper alloy, aluminum (Al), an aluminum alloy, silver (Ag) or a silver alloy. The metal material has a high plasticity, and thus has good bending resistance.

The touch electrode wire 40 is electrically connected to the auxiliary wire 50, and the orthographic projection of the touch electrode wire 40 on the base 240 overlaps with the orthographic projection of the auxiliary wire 50 on the base 240, which is equivalent to the touch electrode wire 40 being connected in parallel with the auxiliary wire 50. In this way, a resistance of the touch electrode wire 40 may be reduced, thereby improving touch sensing performance of the touch structure 10. In addition, by electrically connecting the auxiliary wire 50 to the touch electrode wire 40, in a case where one of the auxiliary wire 50 and the touch electrode wire 40 is broken, the other of the auxiliary wire 50 and the touch electrode wire 40 may be electrically connected to the touch electrode 30.

Figure 4A:
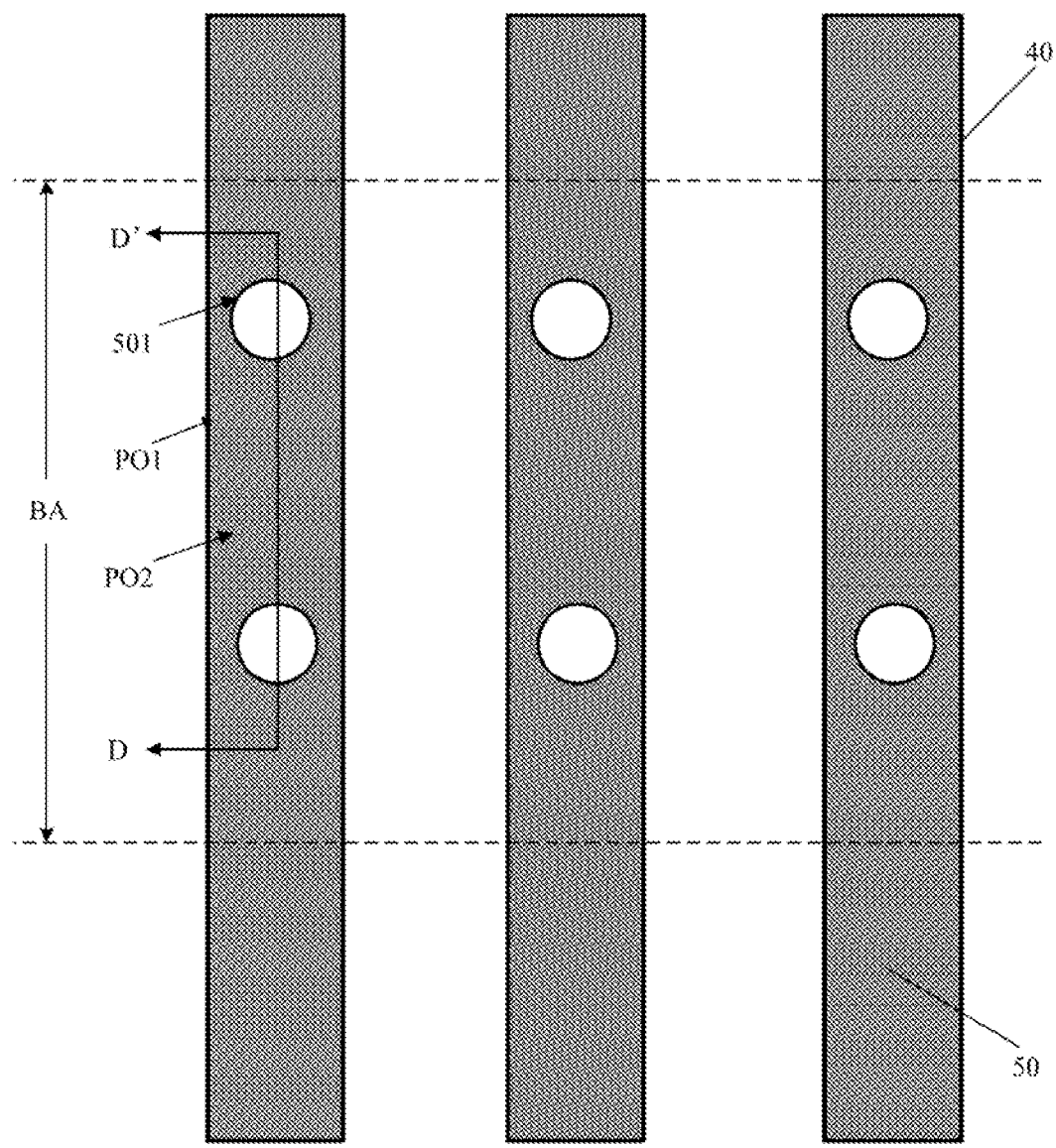
FIG. 4A is a top view of another arrangement of touch electrode wires and auxiliary wires, in accordance with some embodiments of the present disclosure.
Figure 4B:
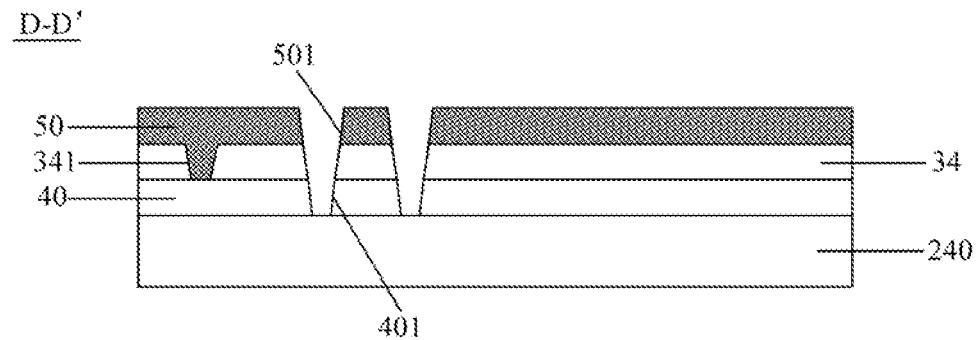
FIG. 4B is a cross-sectional view taken along line D-D' in FIG. 4A.

In some embodiments, as shown in FIGS. 4A and 4B, the auxiliary wire 50 includes a second portion PO2 located in the bending region BA, and at least one second through hole 501 is provided in the second portion PO2. In this way, stress generated when the auxiliary wire 50 is bent along with the touch substrate 24 may be reduced through the at least one second through hole 501, thereby reducing a probability of a break of the portion of the auxiliary wire 50 located in the bending region BA.

As shown in FIGS. 4A and 4B, in the auxiliary wire 50 and the touch electrode wire 40 electrically connected thereto, an orthographic projection of each first through hole 401 on the base 240 at least partially overlaps with an orthographic projection of a corresponding second through hole 501 on the base 240.

For example, the at least one first through hole 401 and the at least one second through hole 501 that are in one-to-one correspondence have a same shape. That is, the orthographic projection of each first through hole 401 on the base 240 completely overlaps with the orthographic projection of a corresponding second through hole 501 on the base 240. In this way, the auxiliary wire 50 and the touch electrode wire 40 may be formed by a patterning process using a same mask, thereby reducing a manufacturing cost.

Figure 4C:
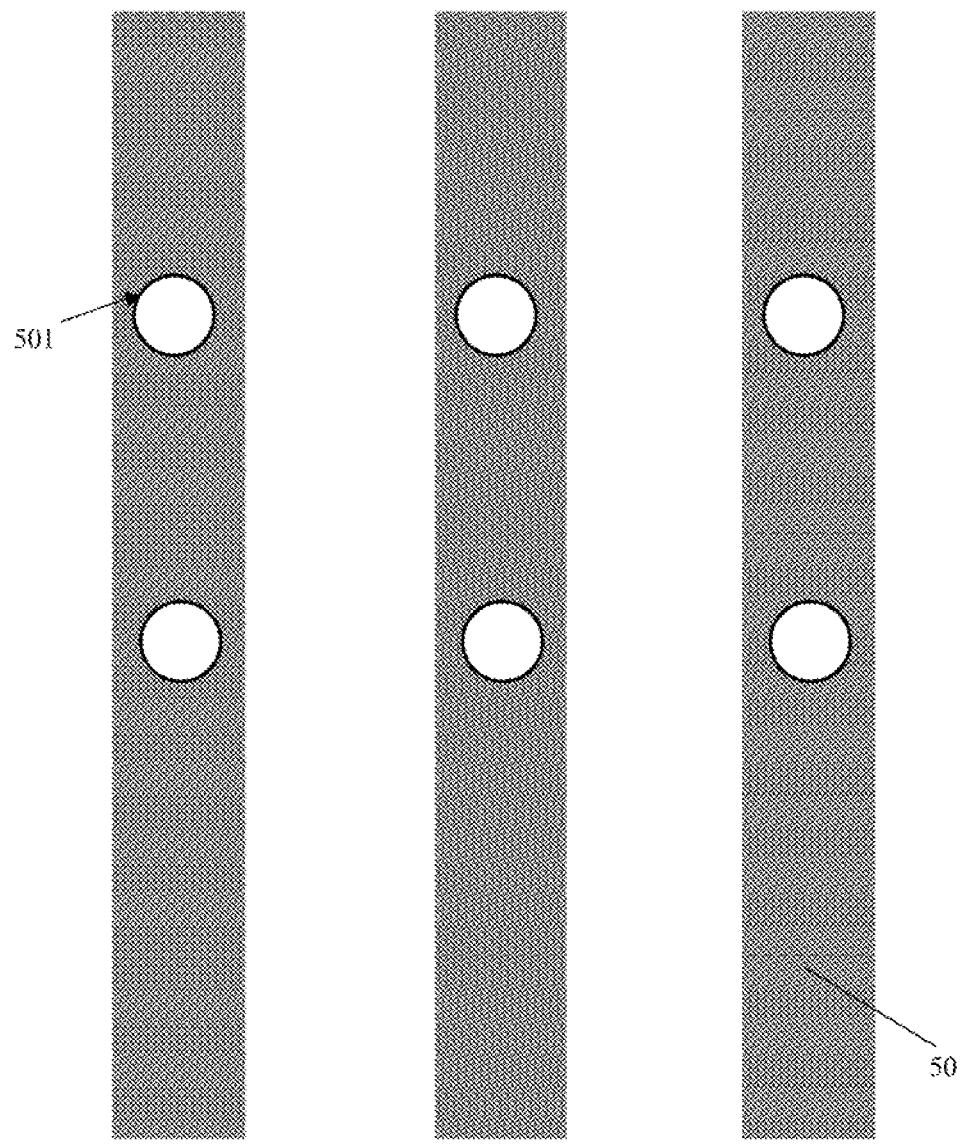
FIGS. 4C to 4E are top views of auxiliary wires, in accordance with some embodiments of the present disclosure.
Figure 4D:
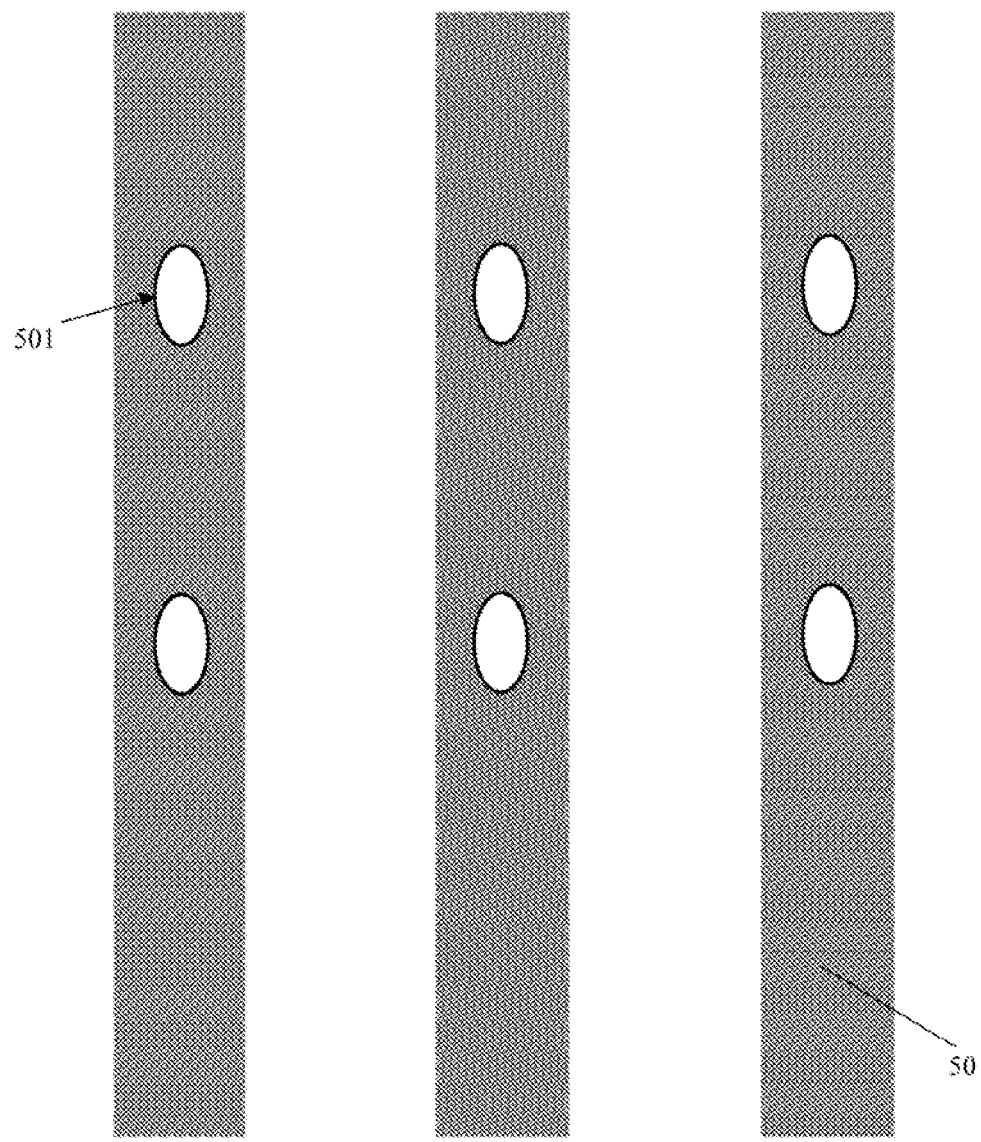
Figure 4E:
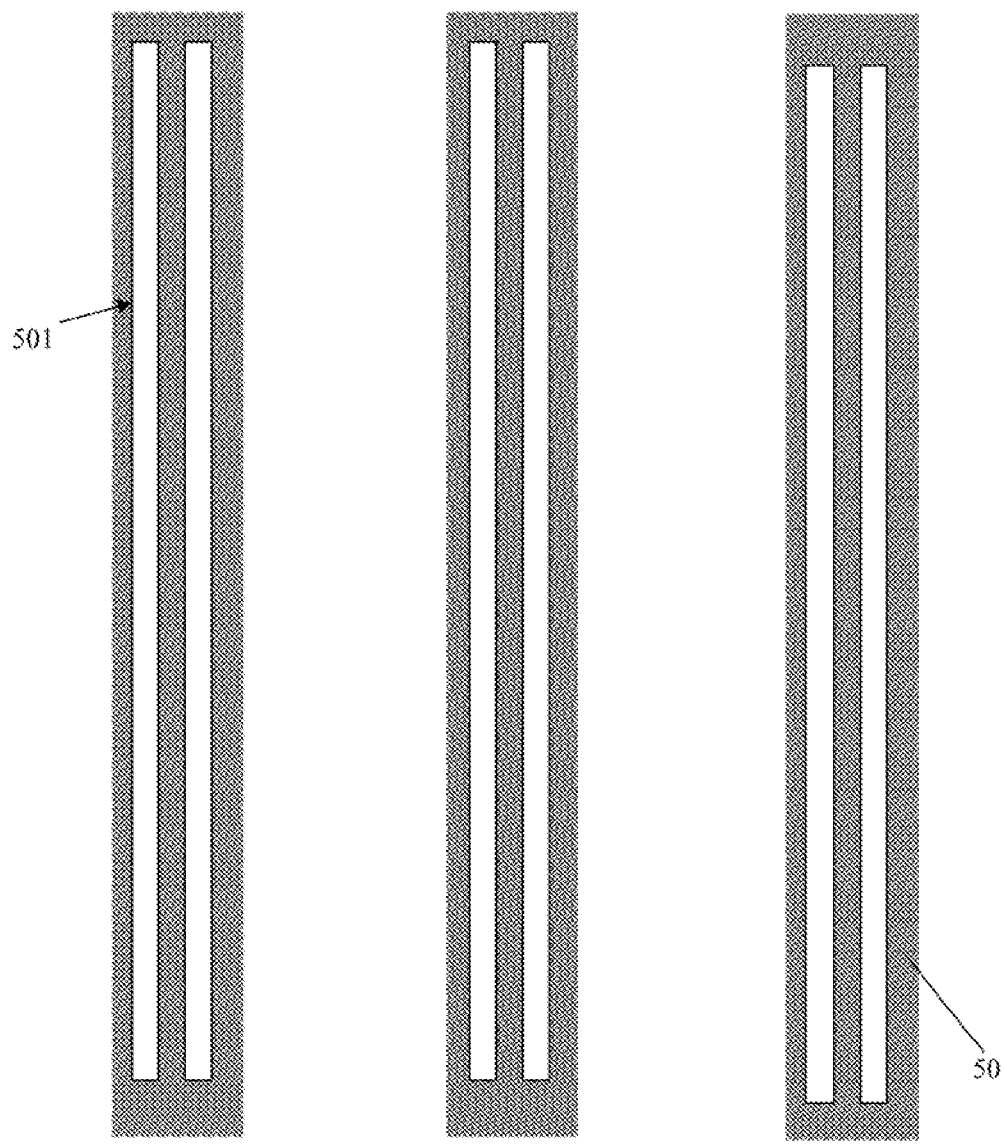

The embodiments of the present disclosure do not limit the shape of the second through hole 501. For example, as shown in FIGS. 4C to 4E, a shape of the second through hole 501 may be a circle, an ellipse or a rectangle. In addition, in order to ensure that the second through hole 501 does not affect conductivity of the auxiliary wire 50, the dimension of the second through hole 501 is smaller than the dimension of the auxiliary wire 50 along a direction of a line width of the auxiliary wire 50. For example, the shape of the second through hole 501 is the circle, and a diameter of the second through hole 501 is one third of a line width of the auxiliary wire 50.

Figure 7:
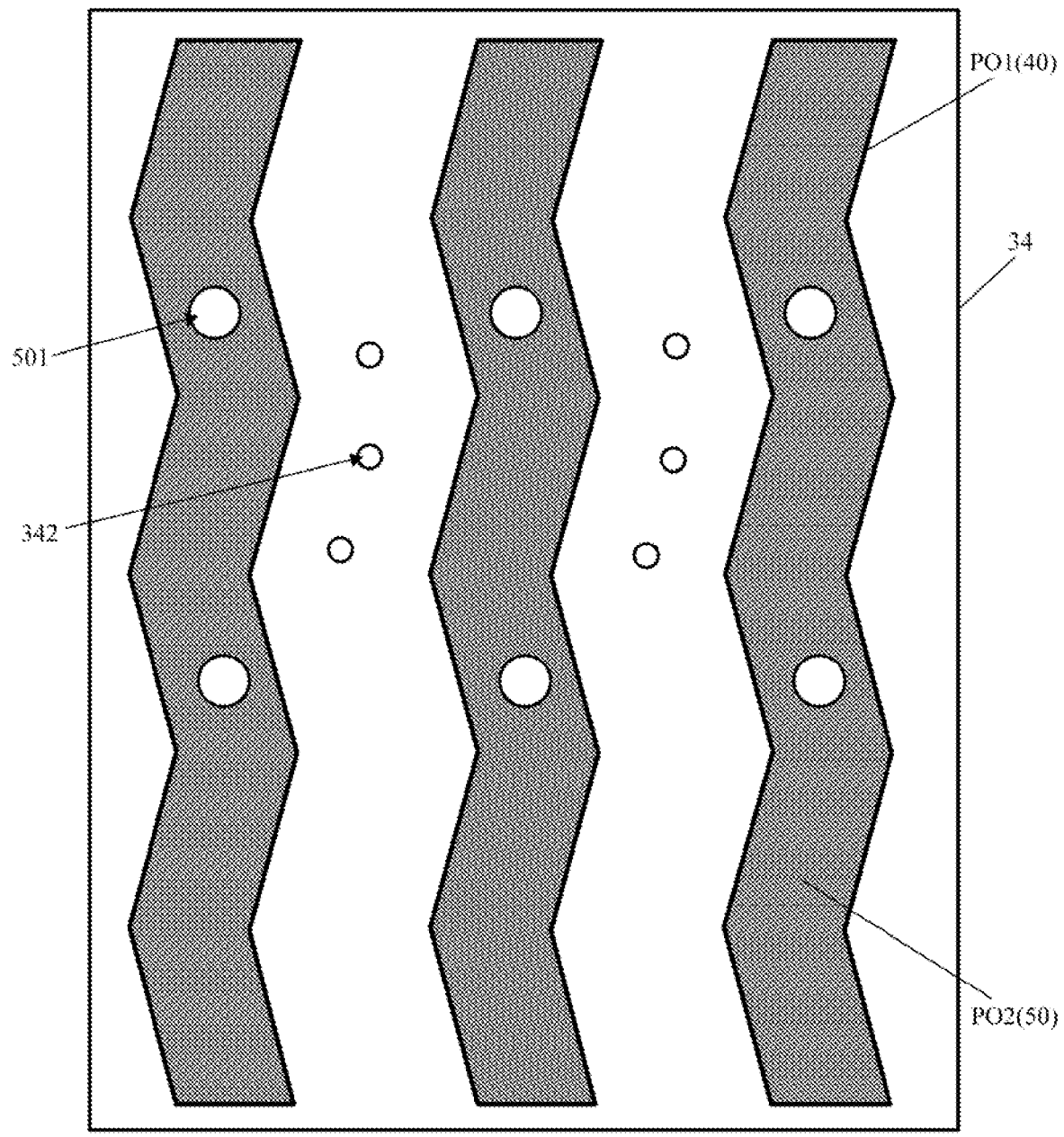
FIG. 7 is a top view of yet another arrangement of touch electrode wires and auxiliary wires, in accordance with some embodiments of the present disclosure.

In some embodiments, as shown in FIG. 7, the second portion PO2 of the auxiliary wire 50 is a second zigzag-shaped line segment. In this way, when the touch substrate 24 is bent, the second zigzag-shaped line segment is not easily broken under action of pulling stress. Therefore, it is possible to reduce a probability of a break of the portion of the auxiliary wire 50 located in the bending region BA.

For example, the second zigzag-shaped line segment includes a plurality of sub-line segments connected in sequence, and an angle between two adjacent line segments is not 0°. In this case, the second zigzag-shaped line segment is a broken line segment.

For another example, the second zigzag-shaped line segment includes a plurality of sub-line segments connected in sequence, and a corner where two adjacent line segments are connected is an arc-shaped corner. In this case, the second zigzag-shaped line segment is a wavy line segment.

Of course, the second zigzag-shaped line segment may further be a zigzag-shaped line segment of other forms, as long as the second portion PO2 is non-linear.

It will be understood that, a shape of the first portion PO1 of the touch electrode wire 40 and a shape of the second portion PO2 of the auxiliary wire 50 in FIG. 7 are merely examples. The embodiments of the present disclosure do not limit the shape of the first portion PO1 of the touch electrode wire 40 and the shape of the second portion PO2 of the auxiliary wire 50.

In some embodiments, as shown in FIGS. 3B and 4B, the touch substrate 24 further includes an insulating layer 34 disposed between the plurality of touch electrode wires 40 and the plurality of auxiliary wires 50. A plurality of third through holes 341 are provided in the insulating layer 34. Each touch electrode wire 40 is electrically connected to a corresponding auxiliary wire 50 through a third through hole 341. Of course, each touch electrode wire 40 may also be electrically connected to a corresponding auxiliary wire 50 through multiple third through holes 341.

Figure 1E:
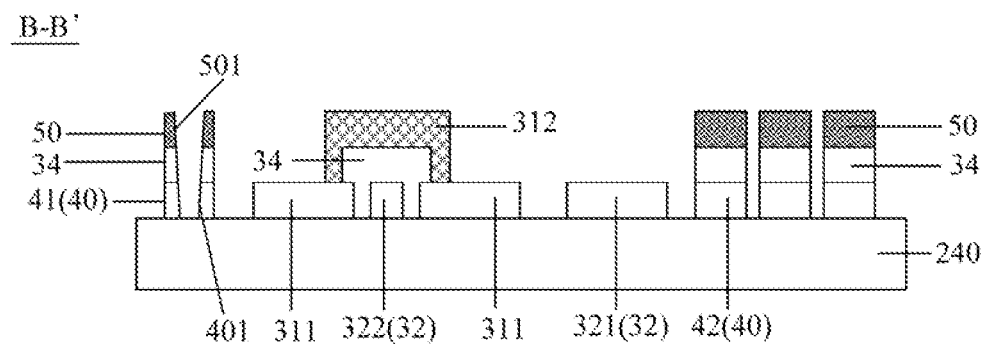
FIG. 1E is a cross-sectional view taken along line B-B' in FIG. 1C.

In some embodiments, as shown in FIGS. 1E and 4B, a fourth though hole is provided in a portion of the insulating layer 34 between a first through hole 401 and a corresponding second through hole 501, and an orthographic projection of the fourth through hole on the base 240 partially or completely overlaps with both an orthographic projection of the first through hole 401 on the base 240 and an orthographic projection of the corresponding second through hole 501 on the base 240. That is, a first through hole 401, a corresponding fourth through hole and a corresponding second through hole 501 are connected in a direction perpendicular to the substrate 240. In this case, the third through holes 341 and the fourth through hole are located at different positions in the insulating layer 34.

Figure 5A:
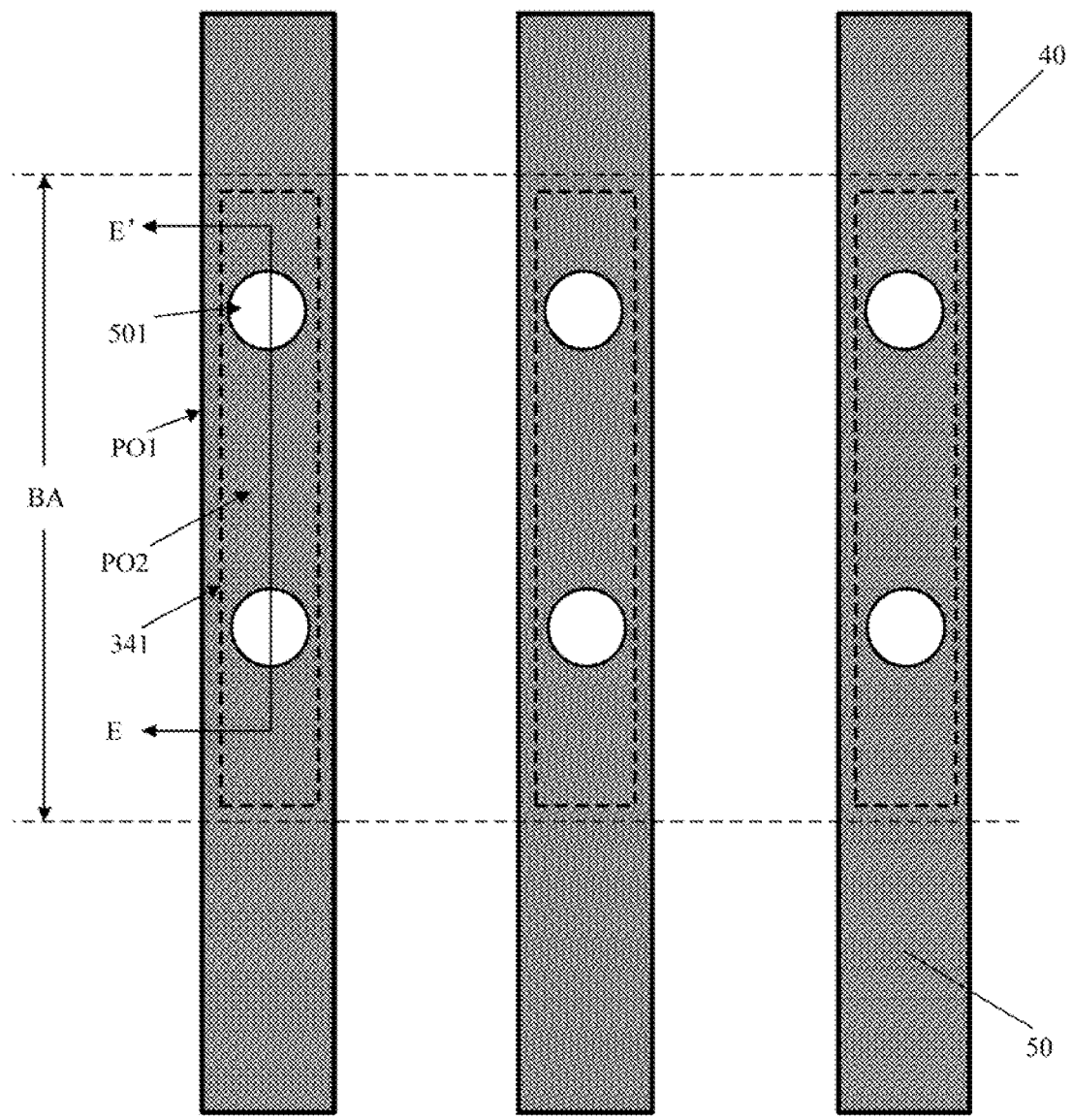
FIG. 5A is a top view of yet another arrangement of touch electrode wires and auxiliary wires, in accordance with some embodiments of the present disclosure.
Figure 5B:
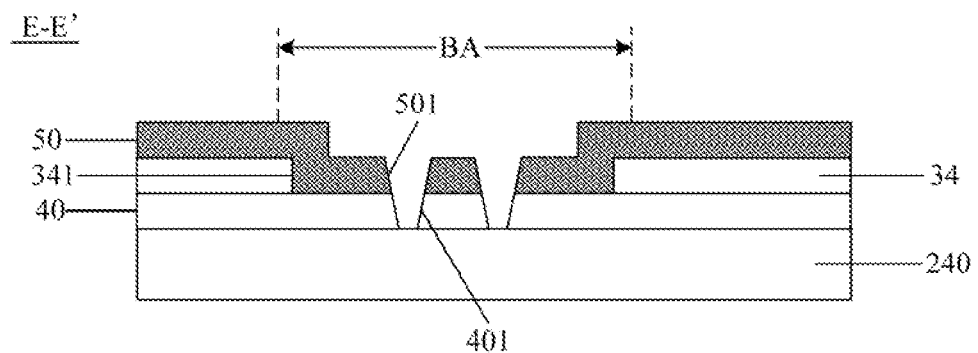
FIG. 5B is a cross-sectional view taken along line E-E' in FIG. 5A.

In some embodiments, as shown in FIGS. 5A and 5B, at least one third through hole 341 of the plurality of third through holes 341 is located in the bending region BA, and the at least one third through hole 341 is a strip-shaped through hole extending along an extending direction of the touch electrode wire 40. That is, an extending direction of a long side of the strip-shaped through hole is consistent with the extending direction of the touch electrode wire 40.

Figure 5C:
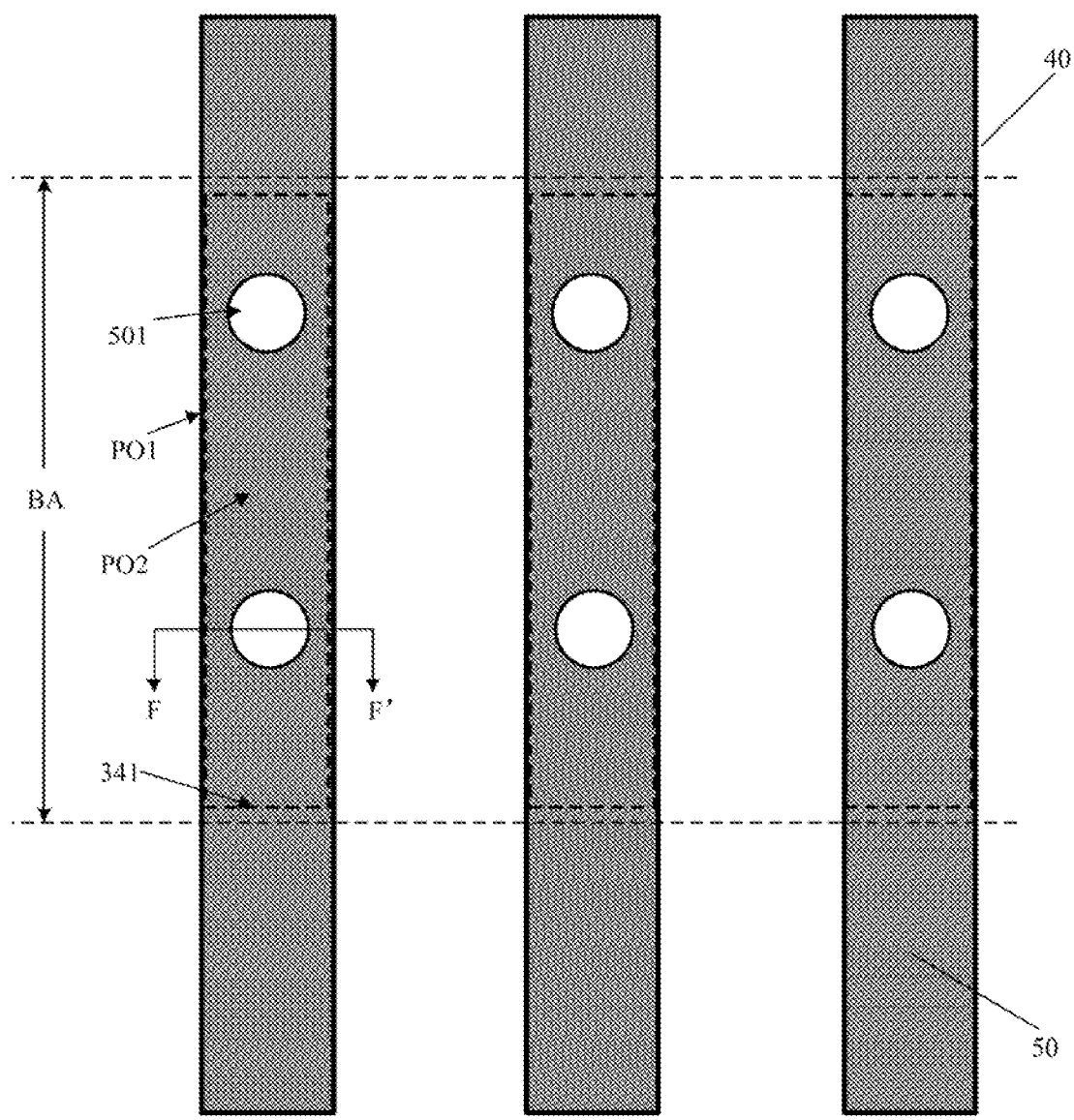
FIG. 5C is a top view of yet another arrangement of touch electrode wires and auxiliary wires, in accordance with some embodiments of the present disclosure.
Figure 5D:
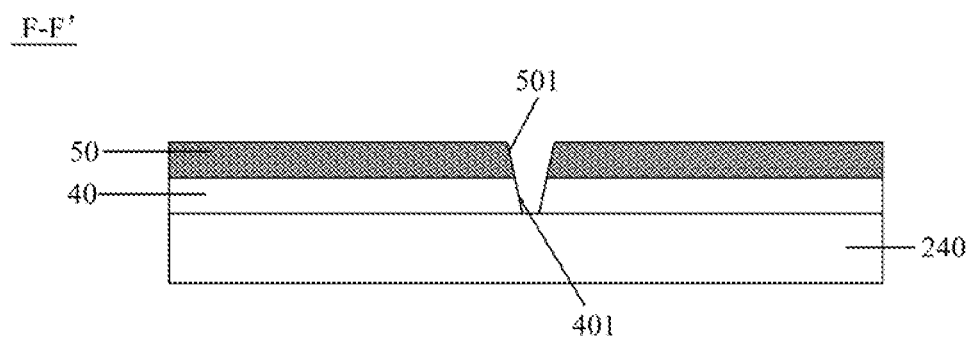
FIG. 5D is a cross-sectional view taken along line F-F' in FIG. 5C.

On this basis, as shown in FIGS. 5C and 5D, each side of the third through hole 341 extending along the extending direction of the touch electrode wire 40 is parallel to both a corresponding side of a corresponding auxiliary wire 50 extending along the extending direction of the touch electrode wire 40 and a corresponding side of a corresponding touch electrode wire 40 extending along the extending direction of the touch electrode wire 40. For example, in the thickness direction of the base 240, each side of the third through hole 341 extending along the extending direction of the touch electrode wire 40 is aligned with both the corresponding side of the corresponding auxiliary wire 50 extending along the extending direction of the touch electrode wire 40 and the corresponding side of the corresponding touch electrode wire 40 extending along the extending direction of the touch electrode wire 40.

That is, a size of the third through hole 341 is increased, which may further reduce stress in the bending region BA when the touch substrate 24 is bent, thereby reducing influence of the stress in the bending region BA on the portion of the touch electrode wire 40 located in the bending region BA and the portion of the auxiliary wire 50 located in the bending region BA.

In some embodiments, as shown in FIGS. 1C to 1D, the base 240 further has the touch region 03 and a wiring region 04, and the wiring region 04 is located on a periphery of the touch region 03. The plurality of touch electrodes 30 are disposed in the touch region 03, and the plurality of touch electrode wires 40 and the plurality of auxiliary wires 50 are disposed in the wiring region 04. It will be understood that, there is an overlapping region OA between a bending region BA and the wiring region 04. In addition, there may or may not be another overlapping region between the bending region BA and the touch region 03, which will be determined according to the position of the bending region BA.

Figure 6A:
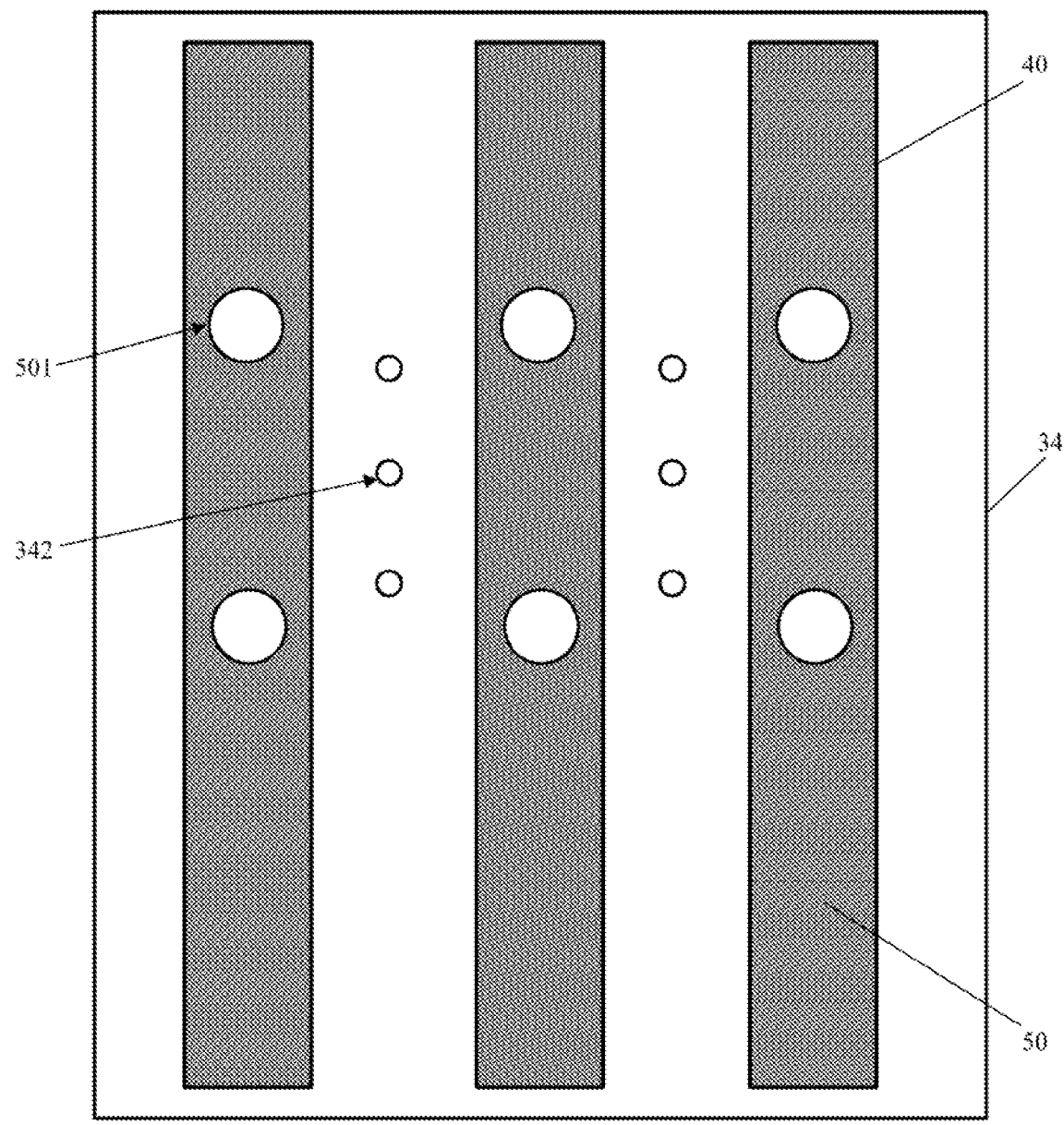
FIG. 6A is a schematic diagram of an arrangement of fifth through holes, in accordance with some embodiments of the present disclosure.
Figure 6B:
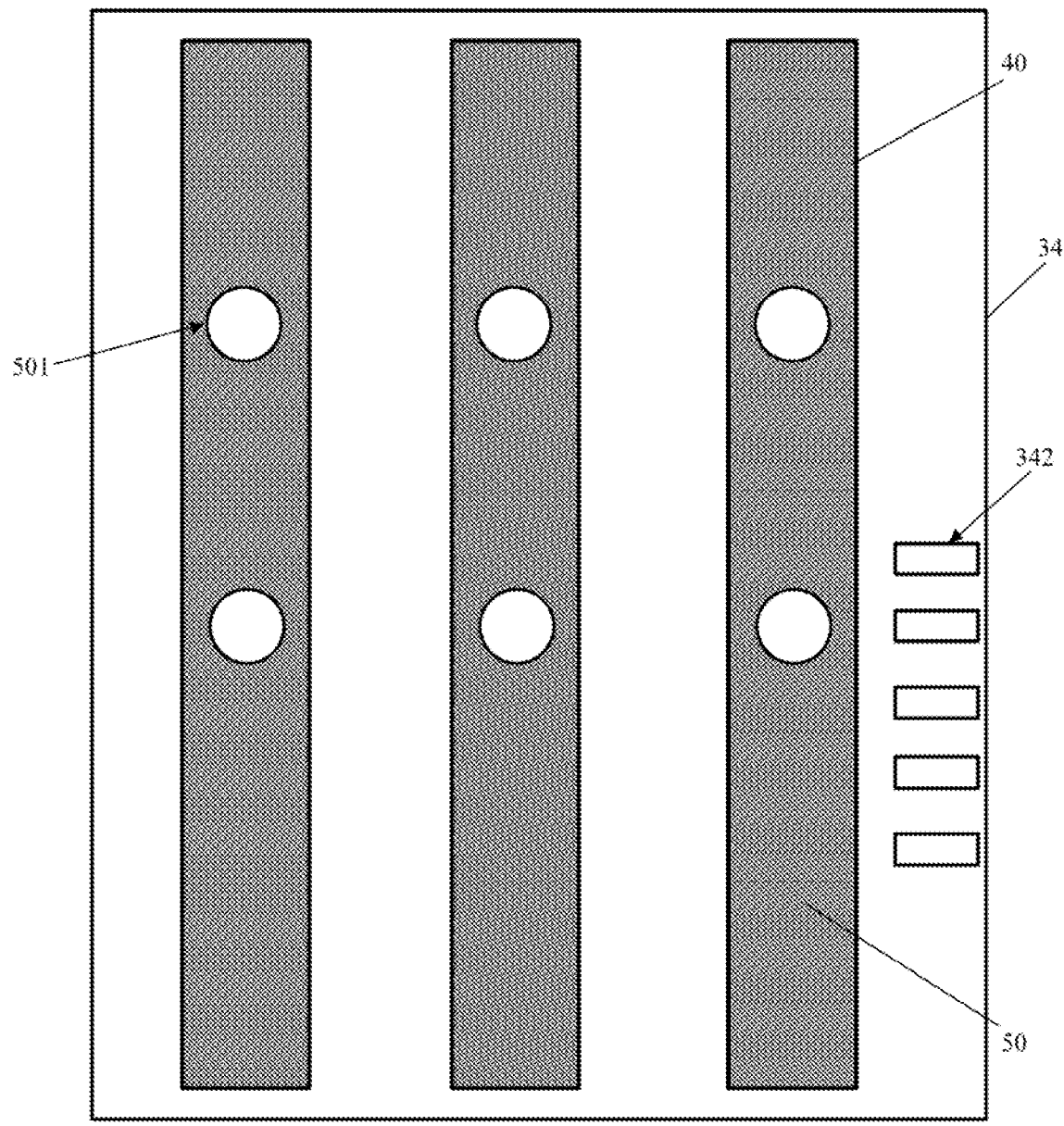
FIG. 6B is a schematic diagram of another arrangement of fifth through holes, in accordance with some embodiments of the present disclosure.
Figure 6C:
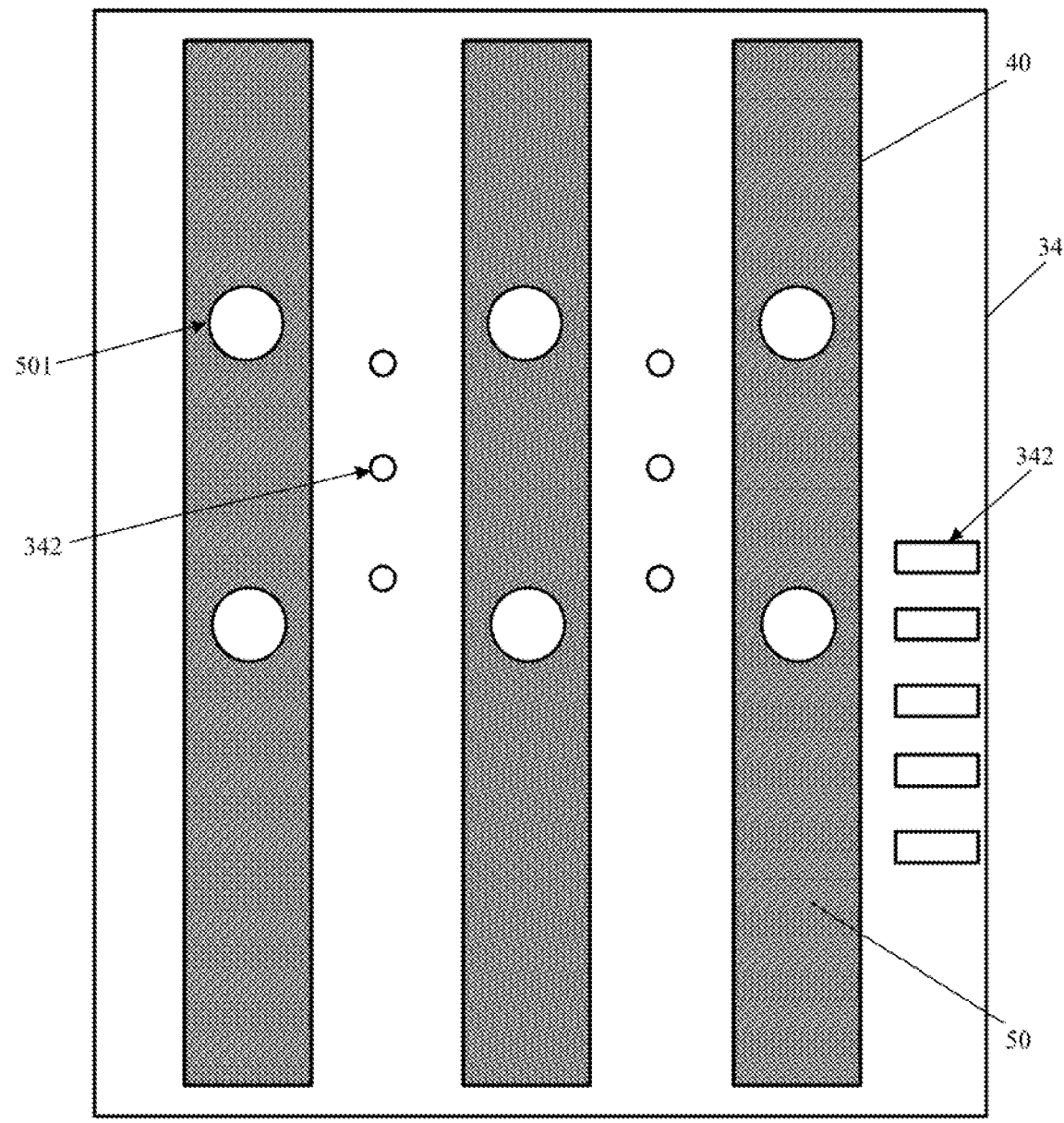
FIG. 6C is a schematic diagram of yet another arrangement of fifth through holes, in accordance with some embodiments of the present disclosure.

As shown in FIGS. 6A to 6C, the insulating layer 34 is further provided with a plurality of fifth through holes 342 located in the overlapping region OA. Orthographic projections of the plurality of fifth through holes 342 on the base 240 do not overlap with both orthographic projections of the plurality of touch electrode wires 40 on the base 240 and orthographic projections of the plurality of auxiliary wires 50 on the base 240.

As shown in FIGS. 6A to 6C, a shape of the fifth through hole 342 may be a circle, an ellipse or a rectangle. The embodiments of the present disclosure do not limit the shape of the fifth through hole 342 and a size of the fifth through hole 342.

In some examples, as shown in FIG. 6A, the plurality of fifth through holes 342 are distributed in regions each between two adjacent touch electrode wires 40.

In some other examples, as shown in FIG. 6B, in a direction perpendicular to the extending direction of the plurality of touch electrode wires 40, the plurality of fifth through holes 342 are disposed at a side of a region where the plurality of touch electrode wires 40 are located.

In yet other examples, as shown in FIG. 6C, a portion of the plurality of fifth through holes 342 are disposed in the regions each between two adjacent touch electrode wires 40, and a remaining portion of the plurality of fifth through holes 342 are disposed at a side of the region where the plurality of touch electrode wires 40 are located in the direction perpendicular to the extending direction of the plurality of touch electrode wires 40.

In this way, by providing the plurality of fifth through holes 342 in the overlapping region OA between the bending region BA and the wiring region 04 in the insulating layer 34, the stress in the bending region BA may be further reduced when the touch substrate 24 is bent.

In some embodiments, as shown in FIGS. 1C and 1D, the plurality of touch electrodes 30 include a plurality of first touch electrodes 31 and a plurality of second touch electrodes 32 that are arranged crosswise (e.g., extending directions of the first touch electrode 31 and the second touch electrode 32 perpendicular to each other) and insulated from each other. The plurality of touch electrode wires 40 include a plurality of first touch electrode wires 41 and a plurality of second touch electrode wires 42 that are insulated from each other. Each first touch electrode 31 is electrically connected to at least one first touch electrode wire 41, and each second touch electrode 32 is electrically connected to at least one second touch electrode wire 42. That is, the touch structure 10 is a mutual-capacitance touch structure.

In some examples, the first touch electrodes 31 are touch driving electrodes, and the second touch electrodes 32 are touch sensing electrodes. The first touch electrode wire 41 is configured to transmit a touch driving signal to a corresponding first touch electrode 31, and the second touch electrode wire 42 is configured to receive a touch sensing signal from a corresponding second touch electrode 32.

In this case, the touch chip sequentially outputs the touch driving signals to the first touch electrodes 31 through the first touch electrode wires 40, and receives the touch sensing signals from the second touch electrodes 32 through the second touch electrode wires 42. When no touch event occurs, a touch sensing signal on each second touch electrode wire 42 is an initial signal. When a touch event occurs, a touch sensing signal on at least one second touch electrode wire 42 is changed relative to the initial signal. On this basis, the touch chip determines the position of the touch point according to positions of the first touch electrodes 31 to which the touch driving signals are input and positions of the second touch electrodes 32 connected to the second touch electrode wires 42 in which the touch sensing signals are changed relative to initial signals.

In some other examples, the first touch electrodes 31 are touch sensing electrodes, and the second touch electrodes 32 are touch driving electrodes. The second touch electrode wire 42 is configured to transmit a touch driving signal to the corresponding second touch electrodes 32, and the first touch electrode wire 41 is configured to receive a touch sensing signal from the corresponding first touch electrode 31.

In some embodiments, as shown in FIG. 1D, a shape of each first touch electrode 31 and a shape of each second touch electrode 32 are each a rectangular bar.

In some embodiments, as shown in FIG. 1C, the first touch electrode 31 includes a plurality of first touch sub-electrodes 311 and a plurality of bridge portions 312, and any two adjacent first touch sub-electrodes 311 in the first touch electrode 31 are electrically connected through a bridge portion 312. As shown in FIG. 1E, the plurality of first touch sub-electrodes 311 are disposed in a same layer as the plurality of second touch electrodes 32. The plurality of auxiliary wires 50 are disposed in a same layer as the plurality of bridge portions 312. By arranging the plurality of auxiliary wires 50 in the same layer as the plurality of bridge portions 312, it is possible to avoid an increase in the number of the patterning processes due to an arrangement of the auxiliary wires 50.

It will be understood that, the bridge portions 312 are respectively located in regions where the first touch electrodes 31 and the second touch electrodes 32 cross.

For example, as shown in FIG. 1E, the plurality of first touch sub-electrodes 311 and the plurality of bridge portions 312 are disposed on both sides of the insulating layer 34 in a thickness direction of the base 240, and any two adjacent first touch sub-electrodes 311 in the first touch electrode 31 are electrically connected through a bridge portion 312.

Orthographic projections of the plurality of first touch sub-electrodes 311 on the base 240 do not overlap with orthographic projections of the plurality of second touch electrodes 32 on the base 240. For example, as shown in FIGS. 1C and 1E, a portion of the insulating layer 34 located in the touch region 03 is composed of a plurality of insulating blocks. For another example, the insulating layer 34 is arranged as a whole layer on the base 240. That is, the insulating layer 34 covers the touch region 03 and the wiring region 04.

In some embodiments, as shown in FIG. 1C, the second touch electrode 32 includes a plurality of second touch sub-electrodes 321 that are connected. For example, the second touch electrode 32 includes a plurality of second touch sub-electrodes 321 arranged in sequence, and a plurality of connecting portions 322, and any two adjacent second touch sub-electrodes 321 in the second touch electrode 32 are electrically connected through a connecting portion 322. The plurality of connecting portions 322 and the plurality of second touch sub-electrodes 321 are disposed in a same layer and are of an integrated structure.

In some embodiments, a shape of the first touch sub-electrode 311 and a shape of the second touch sub-electrode 321 are each a rectangle or a rhombus. The embodiments of the present disclosure do not limit the shape of the first touch sub-electrode 311 and the shape of the second touch sub-electrode 321.

Figure 8:
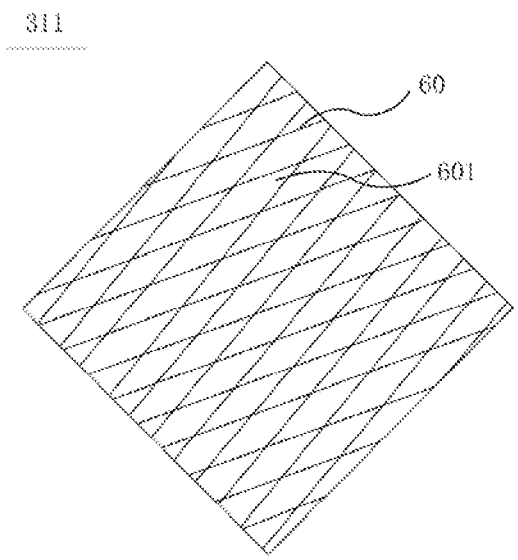
FIG. 8 is a top view of a first touch sub-electrode, in accordance with some embodiments of the present disclosure.

In some embodiments, each of all the first touch sub-electrodes 311 and the second touch sub-electrodes 321 has a mesh structure. For example, as shown in FIG. 8, the first touch sub-electrode 311 includes a plurality of wires, and the plurality of wires intersect to form the mesh structure with a plurality of hollowed-out regions 601. A shape of each hollowed-out region 601 (an outline of an orthographic projection of the hollowed-out region 601 on the base 240) is, for example, a triangle or a quadrangle.

In some embodiments, a material of the plurality of first touch sub-electrodes 311 is a metal material, and a material of the plurality of second touch electrodes 32 is also a metal material. It will be noted that, the material of the plurality of first touch sub-electrodes 311 and the material of the plurality of second touch electrodes 32 may be same or different. That is, the plurality of first touch sub-electrodes 311 and the plurality of second touch electrodes 32 are made of a same metal material or different metal materials.

The metal material includes elemental metal or alloy. For example, the material of the plurality of first touch sub-electrodes 31 and the material of the plurality of second touch electrodes 32 may each include or may be each at least one of Ag, a silver alloy, Cu, a copper alloy, Al, an aluminum alloy, and an aluminum-niobium alloy (AlNb).

For example, as shown in FIG. 8, the first touch sub-electrode 311 is composed of a plurality of metal wires 60, and the plurality of metal wires 60 intersect to form a mesh structure with a plurality of hollowed-out regions 601. That is, the first touch sub-electrode 311 has a metal mesh structure.

For example, as shown in FIG. 8, the second touch sub-electrode 321 is also composed of a plurality of metal wires 60, and the plurality of metal wires 60 intersect to form a mesh structure with a plurality of hollowed-out regions 601. That is, the second touch sub-electrode 321 also has a metal mesh structure.

In the touch substrate 24 provided by some embodiments of the present disclosure, the first touch sub-electrode 311 and the second touch sub-electrode 321 in the touch structure 10 both have a metal mesh structure. Since metal has excellent bending resistance, a probability of damage to the touch structure 10 may be reduced when the touch substrate 24 is bent. Moreover, in a case where the touch substrate 24 is applied to a display device, the hollowed-out regions 601 of the metal mesh structure may correspond to light-emitting regions of sub-pixels of a display panel, which may not affect transmittance of light emitted from the display panel. Therefore, the touch structure 10 does not affect normal display of the display panel.

In some embodiments, as shown in FIG. 1E, the plurality of first touch sub-electrodes 311, the plurality of second touch electrodes 32, the plurality of first touch electrode wires 41, and the plurality of second touch electrodes wires 42 are disposed in a same layer. That is, the plurality of first touch sub-electrodes 311, the plurality of second touch electrodes 32, the plurality of first touch electrode wires 41, and the plurality of second touch electrodes wires 42 may be formed through a single patterning process. In this way, manufacturing processes may be simplified, and a manufacturing cost may be saved.

Figure 9:
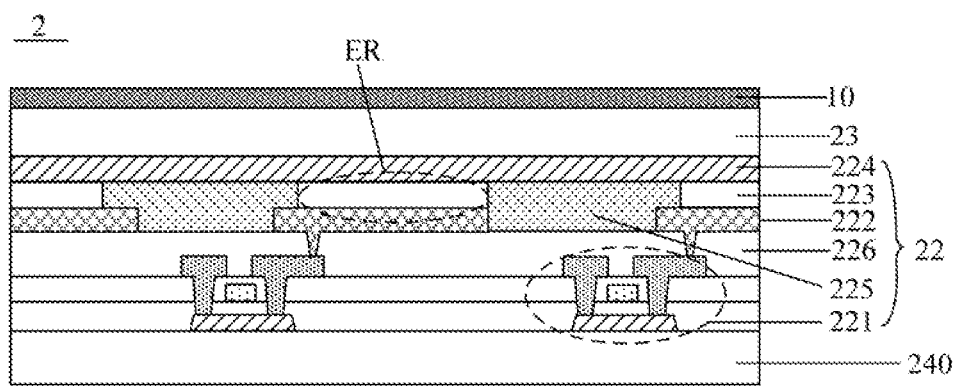
FIG. 9 is a diagram showing a structure of a display panel, in accordance with some embodiments of the present disclosure.

Some embodiments of the present disclosure provide a display panel. As shown in FIG. 9, the display panel 2 includes the above touch substrate.

In some embodiments, as shown in FIG. 9, the display panel 2 further includes a display layer 22 disposed on the base 240 and an encapsulation layer 23 disposed on a side of the display layer 22 away from the base 240. The encapsulation layer 23 is used to prevent water and oxygen in an environment from entering the display layer 22 and causing damage to light-emitting devices in the display layer 22. The touch structure 10 is disposed on a side of the encapsulation layer 23 away from the base 240.

The encapsulation layer 23 may be a thin film encapsulation layer. For example, the encapsulation layer includes a first inorganic sub-layer, an organic sub-layer and a second inorganic sub-layer that are sequentially stacked in a thickness direction of the display panel 2.

In some examples, the touch structure 10 is fixed to the encapsulation layer 23 through an adhesive layer. In some other examples, the touch structure 10 is directly disposed on the encapsulation layer 23. That is, no other film is disposed between the encapsulation layer 23 and the touch structure 10.

Figure 10A:
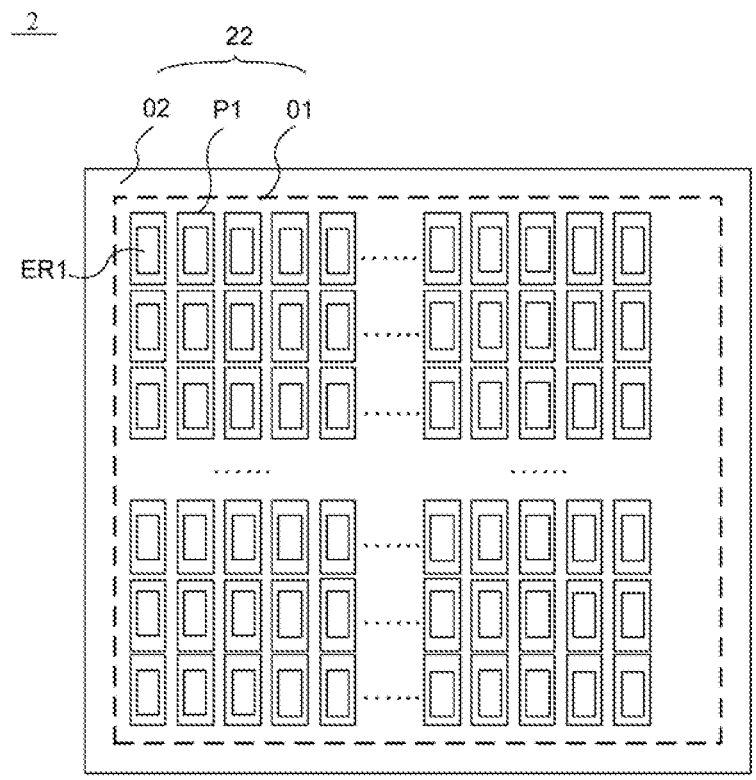
FIG. 10A is a top view of a display panel, in accordance with some embodiments of the present disclosure.
Figure 10B:
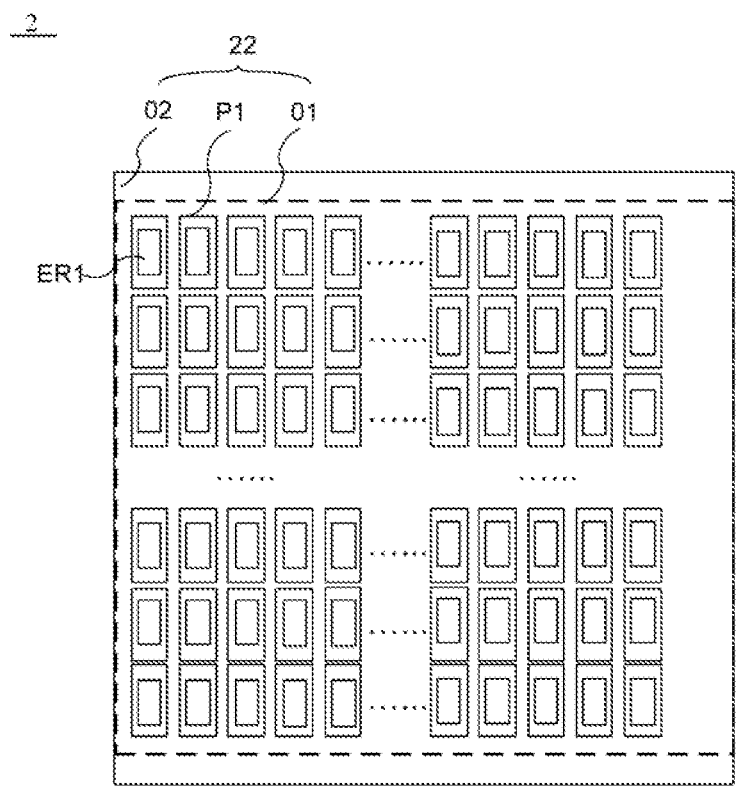
FIG. 10B is a top view of another display panel, in accordance with some embodiments of the present disclosure.

As shown in FIGS. 10A and 10B, the display layer 22 has a first display region 01 and a peripheral region 02 disposed on a periphery of the first display region 01. For example, as shown in FIG. 10A, the peripheral region 02 is disposed around the first display region 01. For another example, as shown in FIG. 10B, the first display region 01 is in a shape of a rectangle, and the peripheral region 02 is disposed on two opposite sides of the first display region 01. Of course, the peripheral region 02 may further be disposed on one or three sides of the first display region 01.

The peripheral region 02 is used for arranging wires, and the peripheral region 02 may be further provided with a driving circuit (e.g., a gate driving circuit) therein.

In some examples, the touch region 03 may completely overlap with the first display region 01 of the display panel 2. In some other examples, the first display region 01 of the display panel 2 is located within a range of the touch region 03, and the touch region 03 is slightly greater than the first display region 01, so as to avoid a touch blind region (that is, a region where a touch cannot be sensed and which may be at an edge of the first display region 01). In addition, the wiring region 03 is located within a range of the peripheral region 02.

As shown in FIGS. 10A and 10B, the first display region 01 includes a plurality of first sub-pixel regions P1, and each first sub-pixel region P1 is provided with a first light-emitting region ER1 therein. On this basis, a region except all first light-emitting regions ER in the first display region 01 is referred to as a non-light-emitting region. An orthographic projection of the touch structure 10 on the base 240 does not overlap with orthographic projections of all first light-emitting regions on the base 240.

In this way, the touch structure 10 does not affect the transmittance of the light emitted from the display panel 2. A material of the touch structure 10 may be any conductive material. In addition, the touch structure 10 does not affect a structure of each first light-emitting region ER1.

In some examples, the display layer 22 includes a light-emitting device and a driving circuit that are located in each first sub-pixel region P1 and disposed on the base 240, and the light-emitting device is located in the first light-emitting region ER1 of the first sub-pixel region P1. The driving circuit includes a plurality of transistors, one of the plurality of transistors is a driving transistor, and remaining transistors are switching transistors. The driving transistor is configured to provide a driving current to the light-emitting device to drive the light emitting device to emit light. A width-to-length ratio of a channel of the driving transistor is greater than a width-to-length ratio of a channel of each switching transistor.

In some examples, as shown in FIG. 9, the light-emitting device is connected to the driving transistor 221. In some other examples, the light-emitting device is connected to a switching transistor connected to the driving transistor 221.

As shown in FIG. 9, the light-emitting device includes a first electrode 292, a light-emitting functional layer 223 and a second electrode 224 that are stacked, and the first electrode 222 is closer to the base 240 relative to the second electrode 224. For example, the first electrode 222 is an anode, and the second electrode 224 is a cathode. For another example, the first electrode 222 is a cathode, and the second electrode 224 is an anode. In a case where the light-emitting device is connected to the driving transistor 221, the first electrode 222 is electrically connected to a drain or a source of the driving transistor 221.

In some examples, the light-emitting functional layer 223 includes a light-emitting layer. In some other examples, in addition to the light-emitting layer, the light-emitting functional layer 223 further includes at least one of an electron transporting layer (ETL), an electron injection layer (EIL), a hole transporting layer (HTL) and a hole injection layer (HIL).

In some examples, the light-emitting layer is an organic light-emitting layer. In this case, the display panel 2 is an organic light-emitting diode (OLED) display panel. In some other examples, the light-emitting layer is a quantum dot light-emitting layer. In this case, the display panel 2 is a quantum dot light-emitting diode (QLED) display panel.

In addition, the light-emitting device may be one of a bottom-emission light-emitting device, a top-emission light-emitting device and a double-sided light-emitting device.

Taking the top-emission light-emitting device as an example, light emitted by the light-emitting device exits from a side of the light-emitting device away from the base 240. In this case, the first electrode 222 is opaque. For example, the first electrode 222 is a multi-layer structure composed of an indium tin oxide (ITO) layer, a silver (Ag) layer and another ITO layer (i.e., ITO/Ag/ITO), so as to reflect light incident onto the first electrode 222 in lights emitted by the light-emitting layer. The second electrode 224 is transparent or translucent. For example, the second electrode 224 is a thin silver electrode layer to transmit the light emitted by the light-emitting layer.

In some examples, as shown in FIG. 9, the display layer 22 further includes a pixel defining layer 225 disposed above the base 240. The pixel defining layer 225 includes a plurality of openings, the light-emitting functional layer 223 of each light-emitting device is disposed in a corresponding opening, and light-emitting functional layers 223 of different light-emitting devices are disposed in different openings. A region where an opening is located is a light-emitting region.

In some examples, as shown in FIG. 9, the display layer 22 further includes a planarization layer 226 disposed between the driving circuit and the first electrode 222. The planarization layer 226 may provide a flat surface for the first electrode 222 to facilitate the formation of the first electrode 222.

In some other embodiments, the touch structure 10 is integrated into the display layer 22 of the display panel 2 to form an in-cell touch display panel.

Some embodiments of the present disclosure provide a display device. The display device may be any product or component having a display function, such as a cellphone, a tablet personal computer (PC), a personal digital assistance (PDA) or a vehicle-mounted computer.

Figure 11:
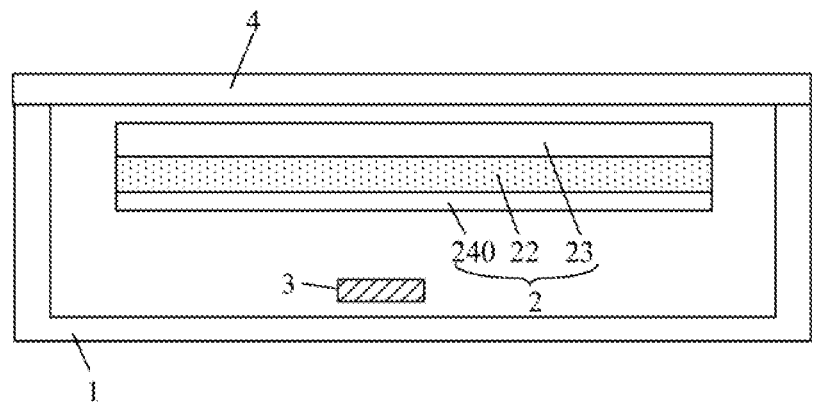
FIG. 11 is a diagram showing a structure of a display device, in accordance with some embodiments of the present disclosure.

As shown in FIG. 11, the display device includes a frame 1, a display panel, a circuit board 3, a cover plate 4, and other electronic accessories such as a camera and a sensor. In some embodiments, the display panel included in the display device is the above display panel 2.

A longitudinal section of the frame 1 is, for example, U-shaped, and the display panel 2 and the circuit board 3 are disposed in the frame 1. The circuit board 3 is disposed below the display panel 2, and the cover plate 4 is disposed at a side of the display panel 2 away from the circuit board 3.

The circuit board 3 is configured to provide signals required for display to the display panel 2. For example, the circuit board 3 is a printed circuit board assembly (PCBA), which includes a printed circuit board (PCB) and a timing controller (TCON), a power management integrated circuit (PMIC) and other ICs or circuits that are disposed on the PCB.

In some embodiments, the display device further includes the above touch substrate 24 and an adhesive layer 101.

Figure 12:
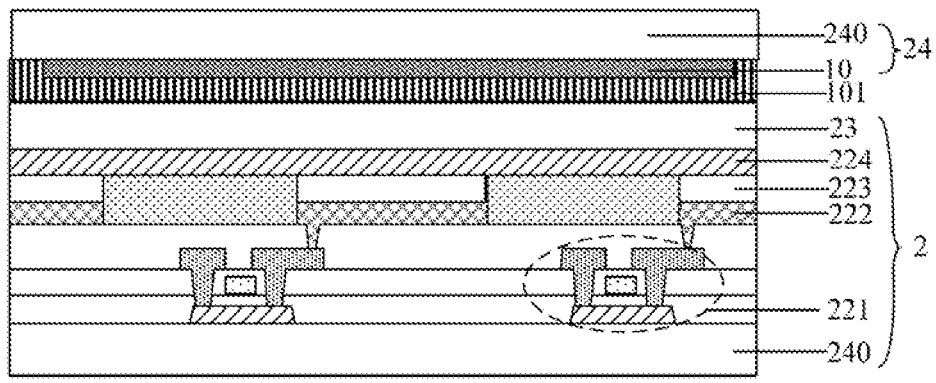
FIG. 12 is a diagram showing a structure of another display device, in accordance with some embodiments of the present disclosure.

As shown in FIG. 12, the touch substrate 24 is fixed to a light-emitting surface of the display panel 2 through the adhesive layer 101, and the touch structure 10 is disposed between the base 240 of the touch substrate 24 and the display panel 2.

For example, a material of the adhesive layer 101 may be an optically clear adhesive. The embodiments of the present disclosure do not limit the material of the adhesive layer 101, as long as the material has adhesiveness and is capable of transmitting light.

In some examples, the touch substrate 24 may be the cover plate 4 of the display device.

Figure 13:
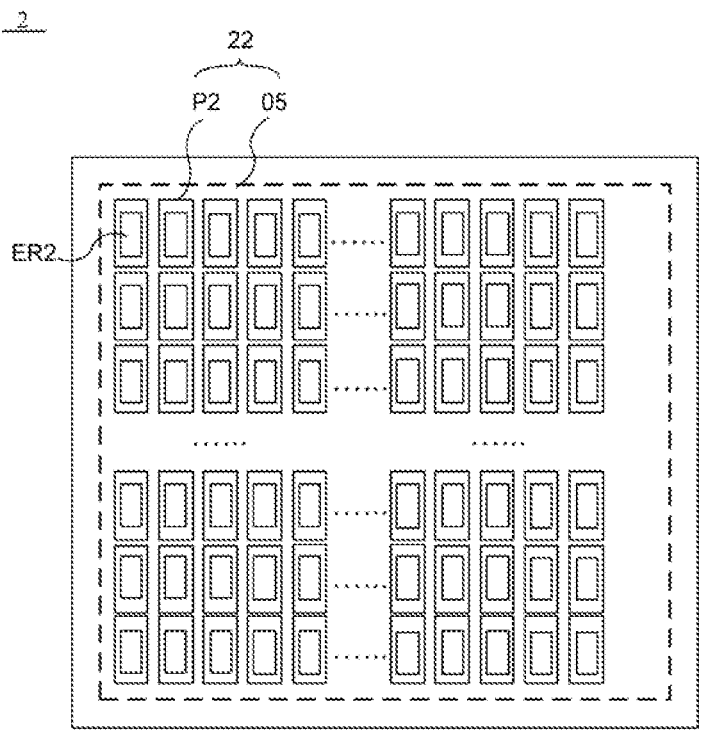
FIG. 13 is a top view of another display panel, in accordance with some embodiments of the present disclosure.

In some embodiments, as shown in FIG. 13, the display panel 2 has a second display region 05, the second display region 05 includes a plurality of second sub-pixel regions P2, and each sub-pixel region P2 includes a second light-emitting region ER2. An orthographic projection of the touch structure 10 on the display panel 2 does not overlap with all second light-emitting regions of the display panel 2. In this way, the touch structure 10 does not affect the transmittance of the light emitted from the display panel 2 and does not affect a display effect of the display device.

The forgoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A touch substrate, comprising:
    a base having at least one bending region, a portion of the base located in each bending region being bendable; and
    a touch structure disposed on the base, the touch structure including a plurality of touch electrodes and a plurality of touch electrode wires electrically connected to the plurality of touch electrodes, wherein at least one touch electrode wire includes a first portion located in one of the at least one bending region, and at least one first through hole is disposed in the first portion; and
    a plurality of auxiliary wires, wherein
    each touch electrode wire is electrically connected to a corresponding auxiliary wire, and an orthographic projection of the touch electrode wire on the base at least partially overlaps with an orthographic projection of the corresponding auxiliary wire on the base;
    an auxiliary wire electrically connected to the touch electrode wire including the first portion includes a second portion located in the one of the at least one bending region, and at least one second through hole is provided in the second portion; and
    in the auxiliary wire and the touch electrode wire electrically connected to the auxiliary wire, an orthographic projection of each first through hole on the base at least partially overlaps with an orthographic projection of a corresponding second through hole on the base.

2. The touch substrate according to claim 1, wherein a first portion in the at least one touch electrode wire is a first zigzag-shaped line segment.

3. The touch substrate according to claim 1, wherein the first portion of the touch electrode wire is a first zigzag-shaped line segment, and the second portion of the auxiliary wire is a second zigzag-shaped line segment.

4. The touch substrate according to claim 1, further comprising an insulating layer disposed between the plurality of touch electrode wires and the plurality of auxiliary wires, wherein
- a plurality of third through holes are disposed in the insulating layer; and the touch electrode wire is electrically connected to a corresponding auxiliary wire through at least one third through hole.

5. The touch substrate according to claim 4, wherein at least one third through hole of the plurality of third through holes is located in the one of the at least one bending region, and the at least one third through hole is a strip-shaped through hole extending along an extending direction of the touch electrode wire.

6. The touch substrate according to claim 5, wherein each side of each of the at least one third through hole extending along the extending direction of the touch electrode wire is parallel to both a corresponding side of a corresponding auxiliary wire extending along the extending direction of the touch electrode wire and a corresponding side of a corresponding touch electrode wire extending along the extending direction of the touch electrode wire.

7. The touch substrate according to claim 4, wherein the base further has a touch region and a wiring region, and the wiring region is disposed on a periphery of the touch region; the plurality of touch electrodes are disposed in the touch region, and the plurality of touch electrode wires and the plurality of auxiliary wires are disposed in the wiring region; the bending region and the wiring region have an overlapping region; and
- a plurality of fifth through holes are disposed in the insulating layer, and the plurality of fifth through holes are disposed in the overlapping region; and orthographic projections of the plurality of fifth through holes on the base do not overlap with both orthographic projections of the plurality of touch electrode wires on the base and orthographic projections of the plurality of auxiliary wires on the base.

8. The touch substrate according to claim 1, wherein the plurality of touch electrodes include a plurality of first touch electrodes and a plurality of second touch electrodes that are arranged crosswise and insulated from each other; and
- the plurality of touch electrode wires include a plurality of first touch electrode wires and a plurality of second touch electrode wires that are insulated from each other; and each first touch electrode is electrically connected to at least one first touch electrode wire, and each second touch electrode is electrically connected to at least one second touch electrode wire.

9. The touch substrate according to claim 8, wherein each first touch electrode includes a plurality of first touch sub-electrodes and a plurality of bridge portions, and any two adjacent first touch sub-electrodes in the first touch electrode are electrically connected through a bridge portion; and
- the plurality of first touch sub-electrodes are disposed in a same layer as the plurality of second touch electrodes; and the plurality of auxiliary wires are disposed in a same layer as the plurality of bridge portions.

10. The touch substrate according to claim 9, wherein each second touch electrode includes a plurality of second touch sub-electrodes and a plurality of connecting portions, and any two adjacent second touch sub-electrodes in the second touch electrode are electrically connected through a connecting portion; and
- the plurality of second touch sub-electrodes and the plurality of connecting portions are disposed in a same layer and are of an integrated structure.

11. The touch substrate according to claim 10, wherein each of all the plurality of first touch sub-electrodes and the plurality of second touch sub-electrodes has a mesh structure.

12. The touch substrate according to claim 10, wherein the plurality of first touch sub-electrodes and the plurality of second touch electrodes are made of a same metal material or different metal materials.

13. The touch substrate according to claim 12, wherein the plurality of first touch sub-electrodes, the plurality of second touch electrodes, the plurality of first touch electrode wires and the plurality of second touch electrode wires are disposed in a same layer.

14. A display panel, comprising the touch substrate according to claim 1.

15. The display panel according to claim 14, further comprising:
- a display layer disposed on the base, the display layer having a first display region, the first display region including a plurality of first sub-pixel regions, and each first sub-pixel region including a first light-emitting region; and
- an encapsulation layer disposed on a side of the display layer away from the base, the touch structure being disposed on a side of the encapsulation layer away from the base; and an orthographic projection of the touch structure on the base not overlapping with orthographic projections of all first light-emitting regions on the base.

16. A display device, comprising the display panel according to claim 14.

17. A display device, comprising a display panel, the touch substrate according to claim 1 and an adhesive layer, the touch substrate is fixed to a light-emitting surface of the display panel through the adhesive layer, and the touch structure being disposed between the base of the touch substrate and the display panel.

18. The display device according to claim 17, wherein the display panel has a second display region, the second display region includes a plurality of second sub-pixel regions, and each second sub-pixel region includes a second light-emitting region; and
- an orthographic projection of the touch structure on the display panel does not overlap with all second light-emitting regions.

* * * * *